(12) United States Patent
Kitoh et al.

(10) Patent No.: US 10,374,245 B2
(45) Date of Patent: Aug. 6, 2019

(54) MANUFACTURING METHOD FOR REINFORCED ELECTROLYTE MEMBRANE AND MANUFACTURING APPARATUS OF MANUFACTURING THE SAME

(71) Applicant: TOYOTA JIDOSHA KABUSHIKI KAISHA, Toyota-shi, Aichi-ken (JP)

(72) Inventors: Hiroki Kitoh, Nagoya (JP); Hiroshi Harada, Toyota (JP); Noritoshi Oka, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 411 days.

(21) Appl. No.: 14/892,784

(22) PCT Filed: May 15, 2014

(86) PCT No.: PCT/IB2014/000862
§ 371 (c)(1),
(2) Date: Nov. 20, 2015

(87) PCT Pub. No.: WO2014/188265
PCT Pub. Date: Nov. 27, 2014

(65) Prior Publication Data
US 2016/0093908 A1 Mar. 31, 2016

(30) Foreign Application Priority Data
May 21, 2013 (JP) .................................. 2013-107082

(51) Int. Cl.
*H01M 8/10* (2016.01)
*B32B 37/12* (2006.01)
(Continued)

(52) U.S. Cl.
CPC ............ *H01M 8/1018* (2013.01); *B29C 51/14* (2013.01); *B32B 37/12* (2013.01); *H01M 8/0293* (2013.01);
(Continued)

(58) Field of Classification Search
CPC ............. H01M 8/1018; H01M 8/1069; H01M 8/0293; Y02P 70/56; B29C 51/14;
(Continued)

(56) References Cited

U.S. PATENT DOCUMENTS 3,020,597 A * 2/1962 Smith-Johannsen ........................ B29C 67/202 264/216
5,151,313 A * 9/1992 Takeuchi ................. G03G 7/00 369/52.1

(Continued)

FOREIGN PATENT DOCUMENTS

CA 2654426 A1 * 12/2007 ........... B01D 67/002
JP 2008-4344 1/2008
(Continued)

*Primary Examiner* — Philip D Tucker
*Assistant Examiner* — Vicki Wu
(74) *Attorney, Agent, or Firm* — Finnegan, Henderson, Farabow, Garrett & Dunner, LLP

(57) ABSTRACT

In an manufacturing apparatus, a belt-shaped electrolyte polymer is conveyed in a state disposed to a back sheet. A first reinforcement membrane is conveyed in a state disposed to a back sheet, and, in a first sticking section, stuck with the belt-shaped electrolyte polymer. In a first thermo-compression bonding section, the belt-shaped electrolyte polymer and the first reinforcement membrane are thermally compressed. At this time, a molten electrolyte polymer reaches between the first reinforcement membrane and the back sheet thereof, and the first adhesiveness between the first reinforcement membrane and the back sheet thereof becomes higher than the second adhesiveness between the
(Continued)

belt-shaped electrolyte polymer and the back sheet thereof. A first peel section peels, in this state, the back sheet from the belt-shaped electrolyte polymer.

2 Claims, 20 Drawing Sheets

(51) Int. Cl.
    *H01M 8/1018*     (2016.01)
    *H01M 8/1069*     (2016.01)
    *H01M 8/0293*     (2016.01)
    *B29C 51/14*     (2006.01)
    *H01M 8/1058*     (2016.01)
    *B32B 37/02*     (2006.01)
    *B32B 37/20*     (2006.01)
    *B32B 38/10*     (2006.01)

(52) U.S. Cl.
    CPC ....... *H01M 8/1058* (2013.01); *H01M 8/1069* (2013.01); *B32B 37/02* (2013.01); *B32B 37/203* (2013.01); *B32B 38/10* (2013.01); *B32B 2260/00* (2013.01); *B32B 2457/18* (2013.01); *Y02P 70/56* (2015.11)

(58) Field of Classification Search
    CPC ..... B32B 37/12; B32B 2260/00; B32B 37/02; B32B 37/203; B32B 38/10; B32B 2457/18
    USPC .......................................................... 156/243
    See application file for complete search history.

(56) References Cited

U.S. PATENT DOCUMENTS

| | | | |
|---|---|---|---|
| 2002/0173392 A1* | 11/2002 | Doi .......... | F16C 33/34 474/209 |
| 2003/0051807 A1* | 3/2003 | Yamaguchi .......... | C08G 59/226 156/272.2 |
| 2008/0152992 A1* | 6/2008 | Abe .......... | B32B 37/12 429/483 |
| 2009/0174105 A1 | 7/2009 | Suzuki | |

FOREIGN PATENT DOCUMENTS

| | | |
|---|---|---|
| JP | 2008-277288 | 11/2008 |
| JP | 2010-62009 | 3/2010 |
| JP | 2010062009 A * | 3/2010 |

* cited by examiner

FIRST STICKING SECTION (STEP 2)

FIG. 4
FIRST THERMOCOMPRESSION
BONDING SECTION (STEP 3)
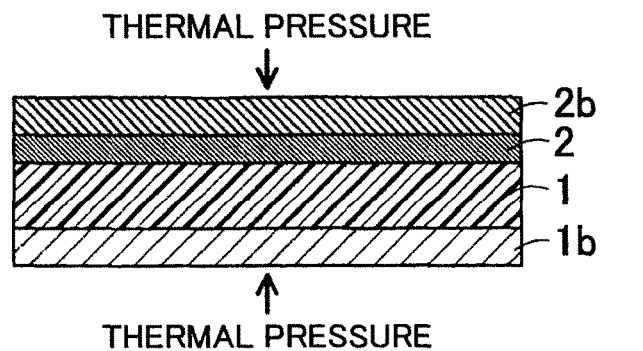
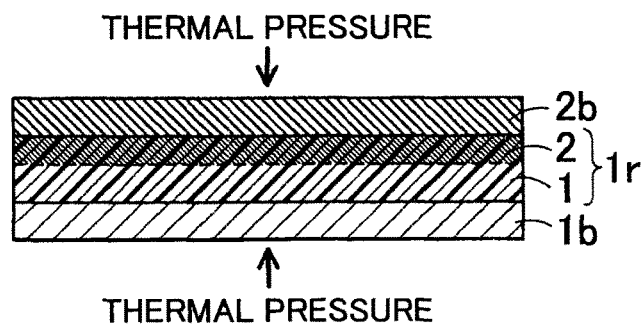
FIRST PEEL SECTION (STEP 4)
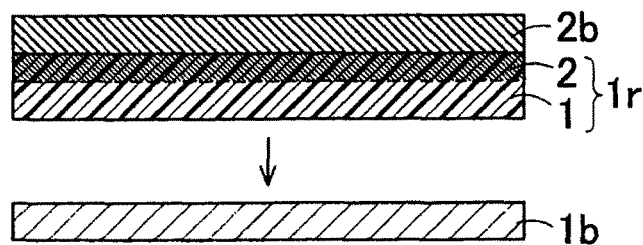

FIG. 5
SECOND STICKING SECTION (STEP 6)
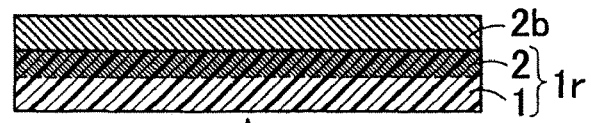
SECOND THERMOCOMPRESSION BONDING SECTION (STEP 7)
THERMAL PRESSURE ↓
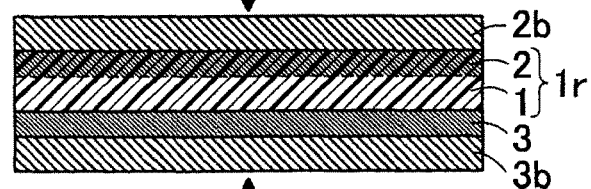
↑ THERMAL PRESSURE
THERMAL PRESSURE ↓
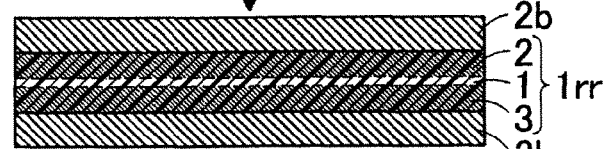
↑ THERMAL PRESSURE
SECOND PEEL SECTION (STEP 8)
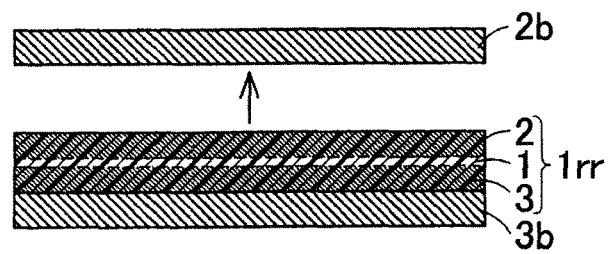

HYDROLYSIS TREATMENT SECTION

| SAMPLE NO. | FREQUENCY OF NECK-IN (%) | DIMENSIONAL CHANGE RATE DUE TO SWELLING (%) | LIMITED NUMBER OF CYCLES | EVALUATION |
|---|---|---|---|---|
| s1 | 23 | 15 | 500 | × |
| s2 | 15 | 10 | 700 | × |
| s3 | 2.2 | 5 | LARGER THAN 2000 | ○ |
| s4 | 0.1 | 4 | LARGER THAN 2000 | ○ |

FIG. 8

| MATERIAL A | MATERIAL B | ADHESIVENESS (N/cm) |
|---|---|---|
| BACK SHEET OF FIRST REINFORCEMENT MEMBRANE (PFA) | FIRST REINFORCEMENT MEMBRANE (e-PTFE) | 0.02 |
| BACK SHEET OF BELT-LIKE ELECTROLYTE POLYMER (PTFE) | BELT-LIKE ELECTROLYTE POLYMER | 1.0 |
| BELT-LIKE ELECTROLYTE POLYMER | FIRST REINFORCEMENT MEMBRANE (e-PTFE) | 0.1 |
| BACK SHEET OF FIRST REINFORCEMENT MEMBRANE (PFA) | SINGLE-SURFACE REINFORCED MEMBRANE (FIRST REINFORCEMENT MEMBRANE SIDE) | 1.4 |
| BACK SHEET OF BELT-LIKE ELECTROLYTE POLYMER (PTFE) | SINGLE-SURFACE REINFORCED MEMBRANE (BELT-LIKE ELECTROLYTE POLYMER SIDE) | 1.2 |

FIG. 9

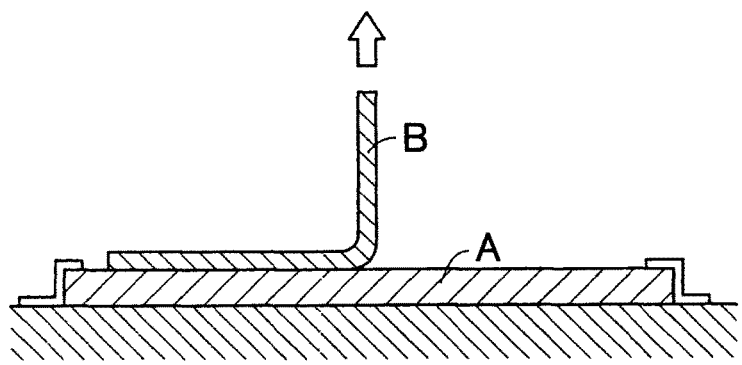

FIG. 13
FIRST STICKING SECTION (STEP 12)
↓
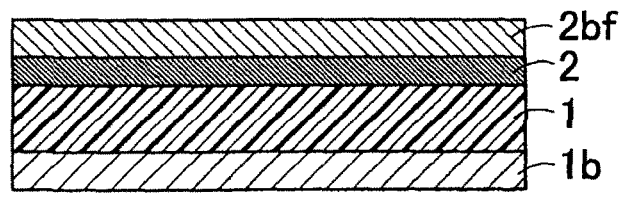
FIRST PEEL SECTION (STEP 13)
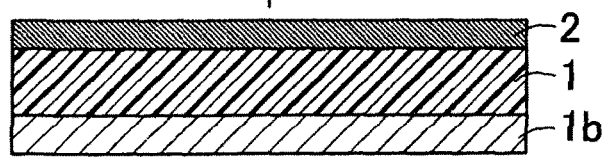

FIG. 14
SECOND STICKING SECTION (STEP 14)
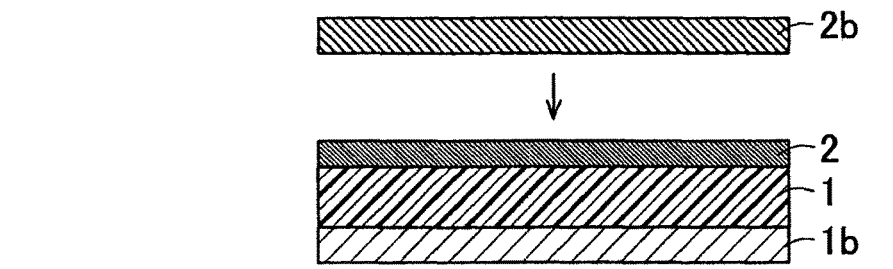
FIRST THERMOCOMPRESSION BONDING SECTION (STEP 15)
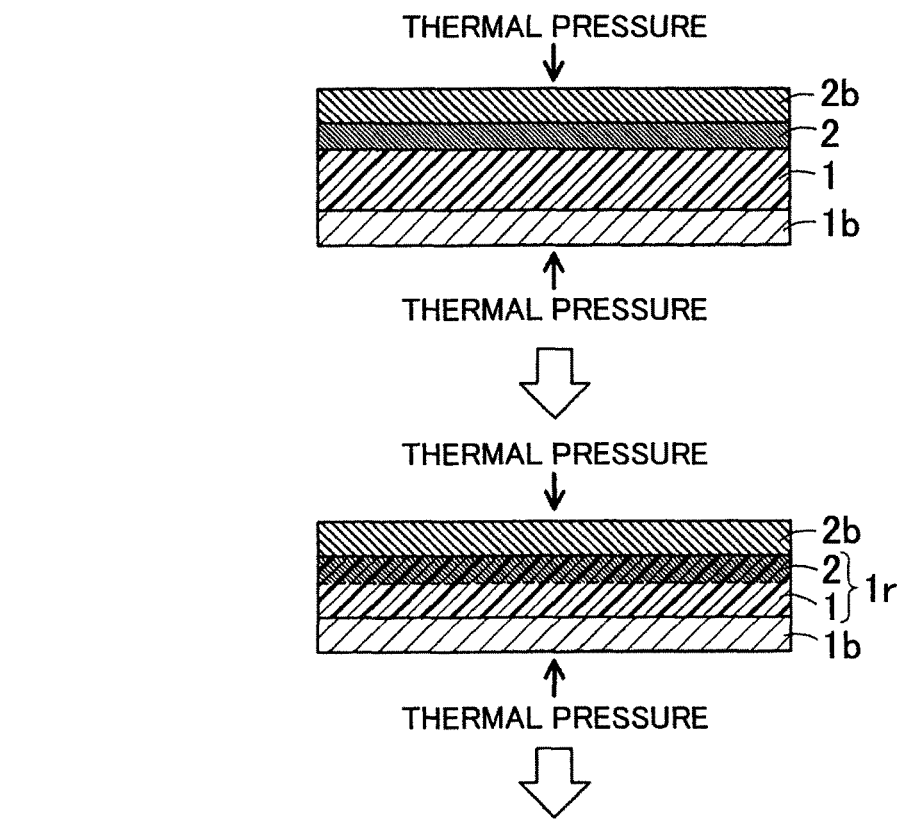
SECOND PEEL SECTION (STEP 16)
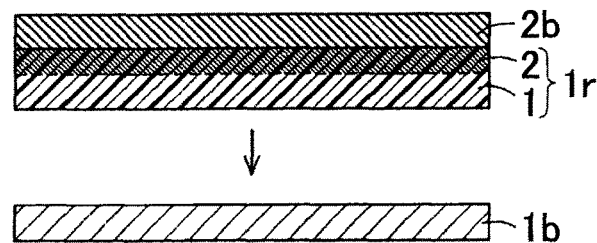

FIG. 15
THIRD STICKING SECTION (STEP 18)
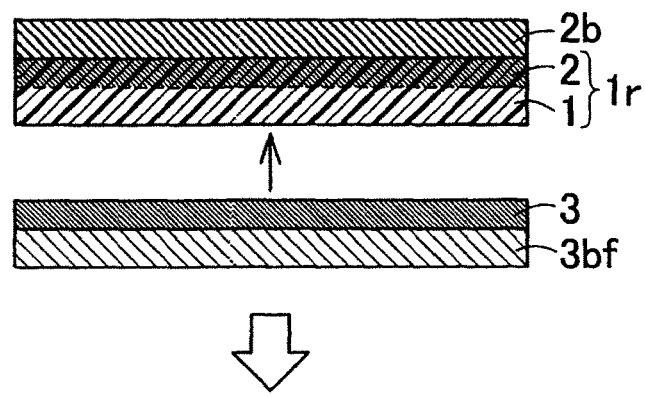
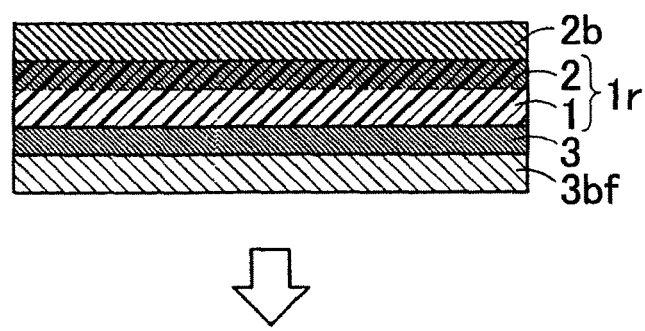
THIRD PEEL SECTION (STEP 19)
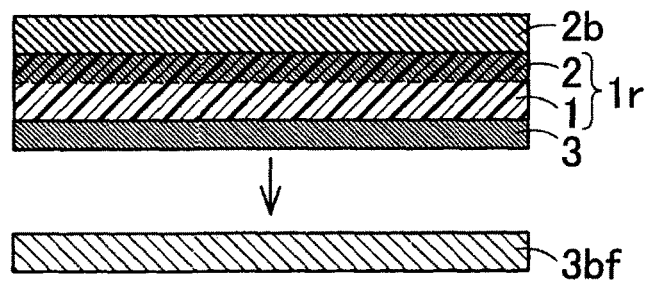

FIG. 16
FOURTH STICKING SECTION (STEP 20)
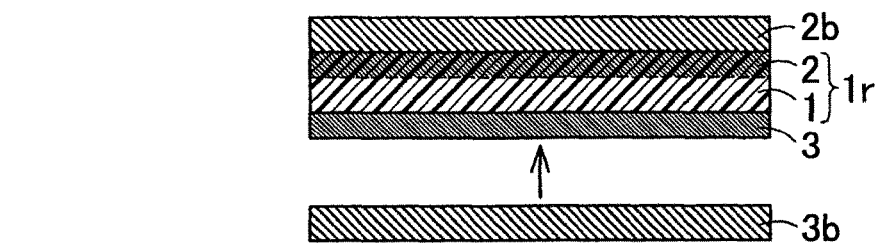
SECOND THERMOCOMPRESSION BONDING SECTION (STEP 21)
THERMAL PRESSURE
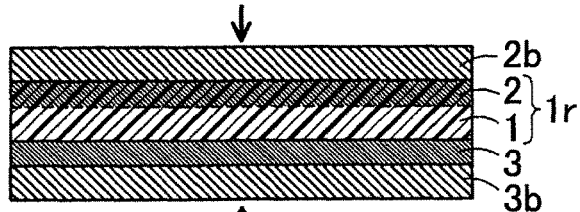
THERMAL PRESSURE
THERMAL PRESSURE
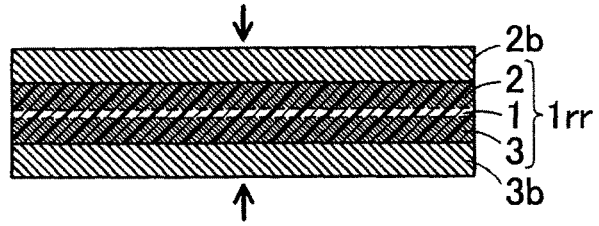
THERMAL PRESSURE
FOURTH PEEL SECTION (STEP 22)
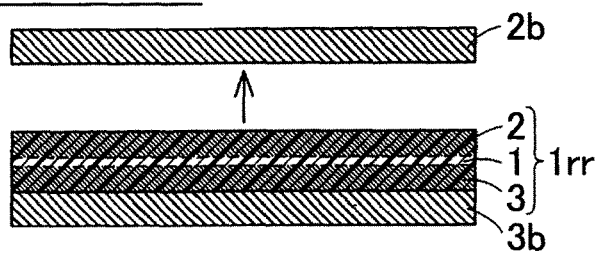

FIG. 17

| MATERIAL A | MATERIAL B | ADHESIVENESS (N/cm) |
|---|---|---|
| BACK SHEET FOR SUPPLY (PET) | FIRST AND SECOND REINFORCEMENT MEMBRANES (e-PTFE) | 0.02 |
| BELT-LIKE ELECTROLYTE POLYMER | FIRST REINFORCEMENT MEMBRANE (e-PTFE) | 0.1 |
| BACK SHEET OF BELT-LIKE ELECTROLYTE POLYMER (PTFE) | BELT-LIKE ELECTROLYTE POLYMER | 1.0 |

FIG. 20
FIRST STICKING SECTION (STEP 32)
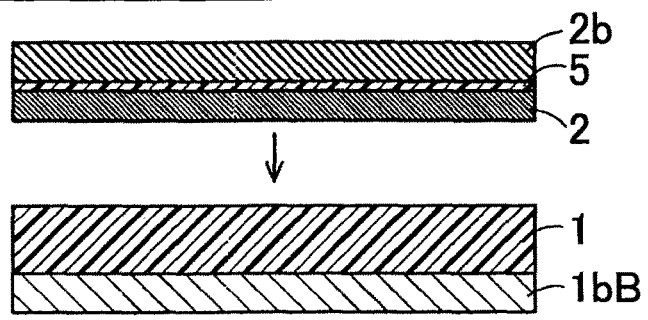
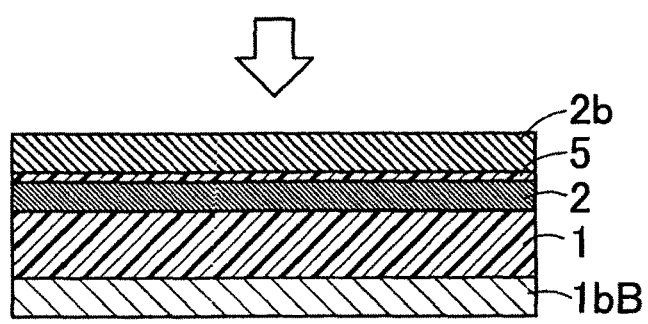
FIRST PEEL SECTION (STEP 33)
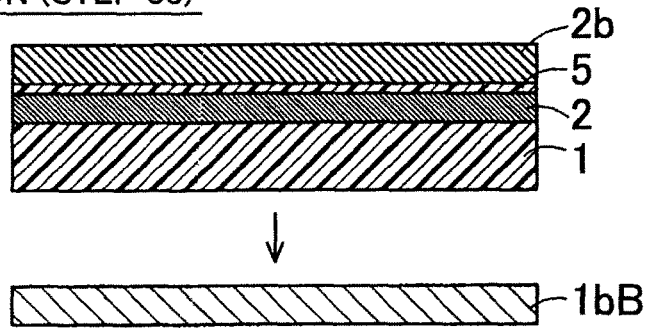

FIG. 22
THERMPCOMPRESSION
BONDING SECTION (STEP 36)
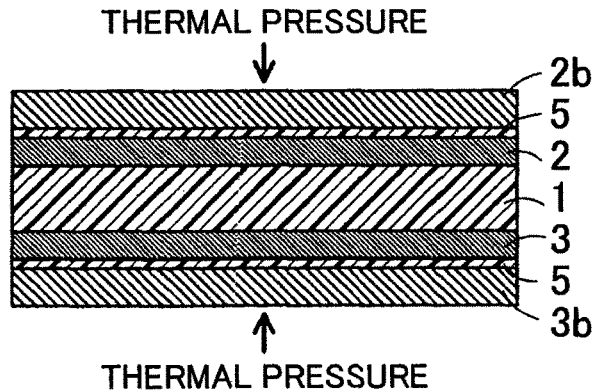
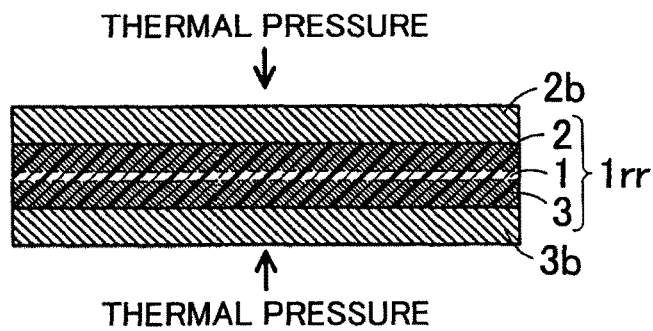
SECOND PEEL SECTION (STEP 37)
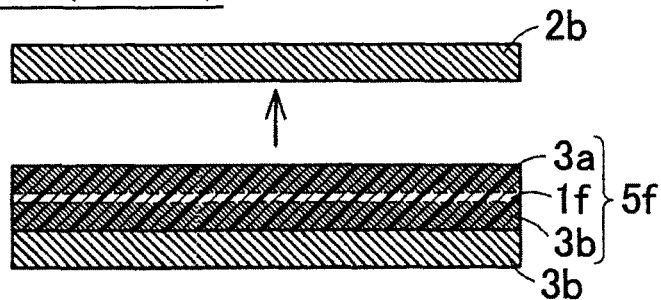

MANUFACTURING METHOD FOR REINFORCED ELECTROLYTE MEMBRANE AND MANUFACTURING APPARATUS OF MANUFACTURING THE SAME

CROSS-REFERENCE TO RELATED APPLICATIONS

This application is a national phase application of International Application No. PCT/IB2014/000862, filed May 15, 2014, and claims the priority of Japanese Application No. 2013-107082, filed May 21, 2013, the content of both of which is incorporated herein by reference.

BACKGROUND OF THE INVENTION

1. Field of the Invention

The present invention relates to a manufacturing method for a reinforced electrolyte membrane and a manufacturing apparatus of manufacturing the same.

2. Description of Related Art

As an electrolyte membrane that has been used for a solid polymer type fuel cell (hereinafter, simply referred to as a "fuel cell"), a reinforced electrolyte membrane that incorporates a porous reinforcement member therein has been known (Japanese Patent Application Publication No. 2008-004344 (JP 2008-004344 A) and Japanese Patent Application Publication No. 2008-277288 (JP 2008-277288 A) shown below). According to a technique of JP 2008-004344 A, at a confluence of two sheets of belt-like porous reinforcement membrane that are transported to be stuck each other, an electrolyte resin is flowed in between two porous reinforcement membranes and the membranes are crimped, thus a reinforced electrolyte membrane is manufactured. According to a technique of JP 2008-277288 A, belt-like electrolyte membranes are superposed from both surfaces of a belt-like reinforcement membrane that is being conveyed and these are thermocompression bonded, thus, a reinforced electrolyte membrane is manufactured.

Now, when a belt-like member is conveyed in a longitudinal direction, so-called neck-in may occur, in which the belt-like member shrinks and deforms in a width direction when the tensile stress is imparted to the belt-like member in a conveying direction. In a manufacturing step of the reinforced electrolyte membrane, when such neck-in occurs during conveyance of the belt-like member such as the electrolyte membrane or the reinforcement member, a function of the strength of the belt-like member degrades, and endurance of the reinforced electrolyte membrane and a fuel cell that uses the reinforced electrolyte membrane are likely to degrade. If the tensile stress that is imparted to the belt-like member during conveyance is controlled to suppress the neck-in from occurring, it is likely that conveyance control becomes complicated and an apparatus becomes expensive.

Thus, in the manufacturing step of the reinforced electrolyte membrane, there was still a room for improving a conveying method of the belt-like member such as the electrolyte membrane and reinforcement member. Other than the above, in the conventional manufacturing step of the reinforced electrolyte membrane, facilitation and simplification of the step, lower cost, resource saving, miniaturization of a device, and an improvement in the handling property have been demanded.

SUMMARY OF THE INVENTION

A first aspect of the present invention relates to a manufacturing method for a reinforced electrolyte membrane that is used in a fuel cell and has a porous reinforcement member disposed inside thereof. The manufacturing method includes (a) a step of conveying a belt-shaped electrolyte polymer that is a belt-shaped body of a first electrolyte polymer in a state disposed on a surface of a first back sheet, in a longitudinal direction of the belt-shaped electrolyte polymer as a conveying direction, (b) a step of conveying a first belt-shaped reinforcement member that is a belt-shaped body in a state disposed on a surface of a second back sheet in the conveying direction and disposing the first belt-shaped reinforcement member on a surface of the belt-shaped electrolyte polymer, and (c) after the step (b), a step of peeling the first back sheet from the belt-shaped electrolyte polymer in a state where a first adhesiveness between the second back sheet and the first belt-shaped reinforcement member is higher than a second adhesiveness between the first back sheet and the belt-shaped electrolyte polymer by a second electrolyte polymer present between the second back sheet and the first belt-shaped reinforcement member. According to the manufacturing method, by using the first and second back sheet, the belt-shaped electrolyte polymer and the belt-shaped reinforcement member during conveyance can be protected. Further, the peeling of the first back sheet from the belt-shaped electrolyte polymer becomes easy, and occurrence of conveyance failure accompanying the peeling can be suppressed.

The step (c) may include a step of making the first adhesiveness between the second back sheet and the first belt-shaped reinforcement member higher than the second adhesiveness between the first back sheet and the belt-shaped electrolyte polymer, in which by thermocompression bonding the belt-shaped electrolyte polymer and the first belt-shaped reinforcement member via the first back sheet and the second back sheet, the first electrolyte polymer that forms the belt-shaped electrolyte polymer is impregnated inside of the first belt-shaped reinforcement member and is made to reach an interface between the second back sheet and the first belt-shaped reinforcement member, thereby the first electrolyte polymer functions as the second electrolyte polymer. Namely, the first electrolyte polymer may be the second electrolyte polymer. According to this manufacturing method, due to the thermocompression bonding step of bonding the belt-shaped electrolyte polymer and the first belt-shaped reinforcement member, the first adhesiveness between the first belt-shaped reinforce member and the second back sheet can be increased, therefore, the peeling of the first back sheet from the belt-shaped electrolyte polymer, which is performed thereafter can be facilitated.

The manufacturing method may further include (d) a step of disposing and thermocompression bonding the second belt-shaped reinforcement member on a surface of the belt-shaped electrolyte polymer from which the first back sheet is peeled. According to the manufacturing method, a reinforced electrolyte membrane in which on both surfaces of the belt-shaped electrolyte polymer the belt-shaped reinforcement member is introduced can be obtained.

Before the step (c) described above, the first adhesiveness between the first belt-shaped reinforcement member and the second back sheet may be lower than the second adhesiveness between the belt-shaped electrolyte polymer and the first back sheet. According to this manufacturing method, when the second back sheet is disposed on a surface of the first belt-shaped reinforcement member, there is no need of setting the adhesiveness therebetween high, therefore, the second back sheet can be easily arranged to the first belt-shaped reinforcement member.

Before the step (a) described above, the first belt-shaped reinforcement member is disposed on a surface of a third back sheet for conveyance having a heat resistant temperature lower than a temperature of the thermocompression bonding in the step (c) described above, the step (a) described above may include a step of exchanging the third back sheet for conveyance with the second back sheet having a heat resistant temperature higher than a temperature of the thermocompression bonding in the step (c) described above. According to the manufacturing method, as the second back sheet that is used before disposing the first belt-shaped reinforcement member on a surface of the belt-shaped electrolyte polymer, a material having lower heat resistance can be used. Therefore, regarding the second back sheet that is used before disposing the first belt-shaped reinforcement member on a surface of the belt-shaped electrolyte polymer, it is possible to select a material focusing on the adhesiveness to the first belt-shaped reinforcement member.

Since the first adhesiveness between the second back sheet and the first belt-shaped reinforcement member is set higher in advance than the second adhesiveness between the first back sheet and the belt-shaped electrolyte polymer before the step (b) described above by disposing in advance an intermediate layer that contains a third electrolyte polymer between the first belt-shaped reinforcement member and the second back sheet, the step (b) described above may include a step of crimping the belt-shaped electrolyte polymer and the first belt-shaped reinforcement member such that a third adhesiveness between the belt-shaped electrolyte polymer and the first belt-shaped reinforcement member is higher than the second adhesiveness between the first back sheet and the belt-shaped electrolyte polymer. Herein, the third electrolyte polymer functions as the second electrolyte polymer. Namely, the third electrolyte polymer may be the second electrolyte polymer. According to the manufacturing method, even before the belt-shaped electrolyte polymer and the first belt-shaped reinforcement member are integrated, the first back sheet can be readily peeled off from the belt-shaped electrolyte polymer. Further, a surface property of the reinforced electrolyte membrane after the belt-shaped electrolyte polymer and the first belt-shaped reinforcement member were integrated can be made excellent.

The manufacturing method described above may further include a step (e) of disposing the second belt-shaped reinforcement member on a surface of the belt-shaped electrolyte polymer from which the first back sheet was peeled and thermocompression bonding the belt-shaped electrolyte polymer and the first and second belt-shaped reinforcement members. According to the manufacturing method, a reinforced electrolyte membrane on both surfaces of which the first and second belt-shaped reinforcement members are crimped can be obtained.

A second aspect of the present invention relates to a manufacturing apparatus of manufacturing a reinforced electrolyte membrane that is used in a fuel cell and has a reinforcement member disposed inside thereof. The manufacturing apparatus includes a conveyance section that conveys a belt-shaped electrolyte polymer that is a belt-shaped body of a first electrolyte polymer in a state disposed on a surface of a first back sheet in a longitudinal direction of the belt-shaped electrolyte polymer as a conveying direction, a reinforcement member disposition section that conveys a first belt-shaped reinforcement member that is a belt-shaped body of the reinforcement member in a state disposed on a surface of a second back sheet in the conveying direction and disposes the first belt-shaped reinforcement member on a surface of the belt-shaped electrolyte polymer, and a back sheet peel section that is disposed in a post-stage of the reinforcement member disposition section and peels the first back sheet from the belt-shaped electrolyte polymer in a state where the first adhesiveness between the second back sheet and the first belt-shaped reinforcement member is higher than the second adhesiveness between the first back sheet and the belt-shaped electrolyte polymer by a second electrolyte polymer present between the second back sheet and the first belt-shaped reinforcement member.

The plurality of constituent elements described above are not necessarily indispensable, and in order to solve a part or an entirety of the problem, or, in order to achieve a part or an entirety of effects described in the present specification, a part of constituent elements among the plurality of the constituent elements can be altered, eliminated, exchanged with new other constituent element, and partial elimination of limited content can be performed. Further, in order to solve a part or an entirety of the problem described above, or, in order to achieve a part or an entirety of effects described in the present specification, it is possible to combine a part or an entirety of the technical features described above and a part or an entirety of the technical features included in another aspect of the present invention described above.

The present invention can be realized also in various modes other than the manufacturing method for a reinforced electrolyte membrane. For example, the present invention can be realized in modes of a manufacturing apparatus of manufacturing a reinforced electrolyte membrane, a reinforced electrolyte membrane manufactured according to the manufacturing method and the manufacturing apparatus described above, a computer program for realizing the manufacturing method and the manufacturing apparatus, and a not temporally recording medium that recorded the computer program.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a schematic view that shows steps in a first thermocompression bonding section and a first peel section;

FIG. 5 is a schematic view that shows steps in a second sticking section, a second thermocompression bonding section, and a second peel section;

FIG. 8 is an explanatory view that shows measurement results of 90° peel test of the adhesiveness between the respective members in the course of the steps of a manufacturing apparatus;

FIG. 9 is a schematic view for describing a method of 90° peel test;

FIG. 13 is a schematic view that shows contents of steps in the first sticking section and the first peel section;

FIG. 14 is a schematic view that shows contents of steps in the second sticking section, the first thermocompression bonding section and the second peel section;

FIG. 15 is a schematic view that shows contents of steps in a third sticking section and a third peel section;

FIG. 16 is a schematic view that shows contents in steps in a fourth sticking section, a second thermocompression bonding section, and a fourth peel section;

FIG. 17 is an explanatory diagram that shows results measured by the 90° peel test of the adhesiveness between the respective members before a back sheet for conveyance is peeled in the first peel section;

FIG. 20 is a schematic view that shows contents of steps in the first sticking section and the first peel section;

FIG. 22 is a schematic view that shows contents of steps in a thermocompression bonding section and the second peeling section.

DETAILED DESCRIPTION OF EMBODIMENTS

A. First Embodiment

Figure 1:
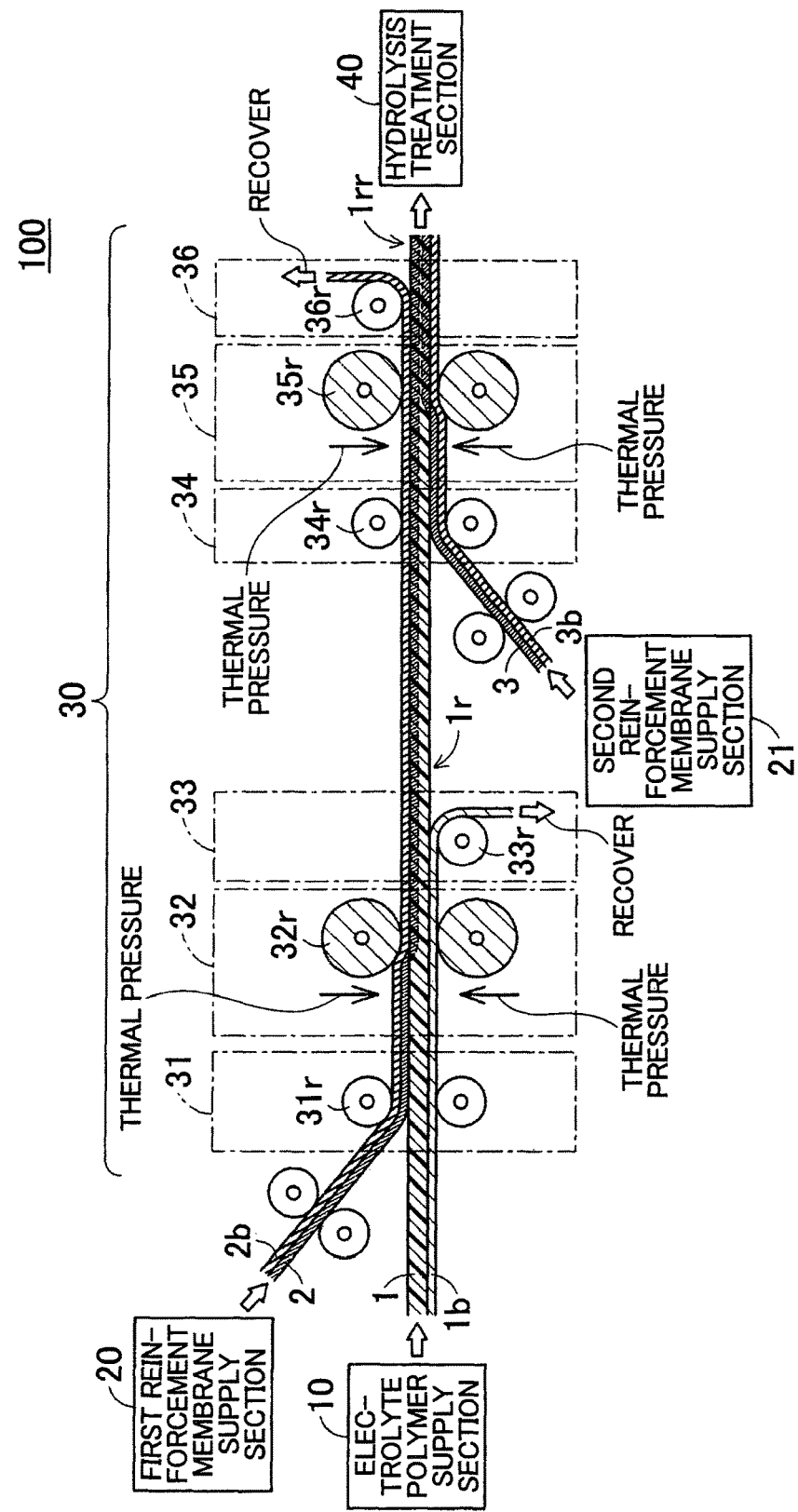
FIG. 1 is a schematic view that shows a structure of a manufacturing apparatus of manufacturing a reinforced electrolyte membrane as a first embodiment.

FIG. 1 is a schematic diagram that shows a structure of a manufacturing apparatus 100 of manufacturing a reinforced electrolyte membrane as a first embodiment of the present invention. The manufacturing apparatus 100 manufactures a reinforced electrolyte membrane inside of which a porous reinforcement member is incorporated by continuously conveying a belt-like member. The manufacturing apparatus 100 includes an electrolyte polymer supply section 10, a first reinforcement membrane supply section 20, a second reinforcement membrane supply section 21, a processing section 30, and a hydrolysis treatment section 40.

The electrolyte polymer supply section 10 supplies a belt-like electrolyte polymer 1 disposed to a back sheet 1b to the processing section 30. More specifically, the electrolyte polymer supply section 10 conveys the belt-like electrolyte polymer 1 wound in roll in a state disposed to the back sheet 1b to the processing section 30 by a conveying roller (omitted from showing in the drawing). The electrolyte polymer supply section 10 may be structured such that the belt-like electrolyte polymer 1 and the back sheet 1b, which are separately wound in roll are conveyed to the processing section 30 after sticking each other.

The belt-like electrolyte polymer 1 is a member formed by molding an electrolyte polymer before the proton conductivity is imparted by hydrolysis treatment in a belt. The electrolyte polymer is a fluorinated ion exchange resin that forms an electrolyte membrane for a fuel cell, and is formed by a perfluorosulfonic acid-based polymer such as Nafion (registered trade mark). A thickness of the belt-like electrolyte polymer 1 is, for example, preferably about 5 to 15 µm and more preferably about 5 to 10 µm. When the thickness of the belt-like electrolyte polymer 1 is within these ranges, sufficient proton conductivity can be secured in a fuel cell.

The back sheet 1b of the belt-like electrolyte polymer 1 is desirable to have a thickness and stiffness to a degree that can suppress damage and degradation of the belt-like electrolyte polymer 1 due to conveyance. Further, the back sheet 1b is preferable to have the heat resistance to a degree that can withstand the thermocompression bonding step (described below) in the processing section 30. Specifically, the maximum continuous operating temperature of the back sheet 1b is preferable to be higher than 230° C. Further, a surface of the back sheet 1b may be relatively rough and the surface roughness (Ra) thereof may be about 400 to 2000 nm.

In the present embodiment, the back sheet 1b is formed from the following polytetrafluoroethylene (PTFE).

<PTFE forming Back Sheet 1b>
Elastic modulus: about 0.3 to 0.5 GPa
Thickness: about 45 to 55 µm
Surface roughness (Ra): about 900 to 1100 nm
Maximum continuous operating temperature: about 250 to 270° C.

Herein, the adhesiveness between the belt-like electrolyte polymer 1 and the back sheet 1b is preferable to secure a supporting property of the belt-like electrolyte polymer 1. Further, the adhesiveness between the belt-like electrolyte polymer 1 and the back sheet 1b is preferably adjusted not to be higher than the adhesiveness between the first reinforcement membrane 2 and the back sheet 2b after the belt-like electrolyte polymer 1 and the first reinforcement membrane 2 are thermocompression bonded. The reason for this will be described below.

The adhesiveness between the belt-like electrolyte polymer 1 and the back sheet 1b can be adjusted by a kind and a surface property of the back sheet 1b, a pressing force, pressing time and a temperature when sticking. Specifically, the adhesiveness between the belt-like electrolyte polymer 1 and the back sheet 1b may be adjusted to a degree that can obtain a measurement result of 0.8 to 1.2 N/cm in the 90° peel test.

A first reinforcement membrane supply section 20 supplies a belt-like first reinforcement membrane 2 in a state disposed to a back sheet 2b to a processing section 30, and a second reinforcement membrane supply section 21 supplies a belt-like second reinforcement membrane 3 in a state disposed to a back sheet 3b to the processing section 30. More specifically, each of the first and second reinforcement membrane supply sections 20 and 21 conveys the first and second reinforcement membranes 2 and 3 wound in roll in a state disposed to the back sheets 2b and 3b to the processing section 30 by a driving roller (omitted from showing in the drawing). The first and second reinforcement membrane supply section 20 and 21 may be formed such that the first and second reinforcement membranes 2 and 3 and the back sheets 2b and 3b, which are prepared as separate bodies are conveyed to the processing section 30 after sticking each other.

The first and second reinforcement membranes 2 and 3 are a porous belt-like reinforcement member in which a molten electrolyte polymer can be impregnated. In the present embodiment, each of the first and second reinforcement membranes 2 and 3 is formed of the following expanded PTFE (ePTFE). When the first and second reinforcement membranes 2 and 3 are formed with the following ePTFE, a reinforced electrolyte membrane that can combine suitable thickness and strength can readily be manufactured.

<ePTFE that forms First and Second Reinforcement Membranes 2 and 3>
Basis weight: about 0.1 to 0.3 mg/cm$^2$
Strength: about 0.5 to 2.0 N/mm (at 10% strain)

Each of the back sheets 2b and 3b of the first and second reinforcement membranes 2 and 3 is desirable to have a thickness and stiffness to an extent that can suppress damage and degradation due to the conveyance of the first and second reinforcement membranes 2 and 3 from occurring. Further, the back sheets 2b and 3b are preferable to have the heat resistance to an extent that can withstand the thermocompression bonding step (described below) in the processing section 30. Specifically, the maximum continuous operating temperatures of the back sheets 2b and 3b are preferable to be higher than 230° C. Further, surfaces of the back sheets 2b and 3b are preferable to be relatively smooth, for example, the surface roughness (Ra) thereof is preferable to be about 100 to 200 nm. Thus, the surface property of the reinforced electrolyte membrane from which the back sheets 2b and 3b are peeled can be suppressed from being degraded.

Now, the ePTFE that forms the first and second reinforcement membranes 2 and 3 in the present embodiment is generally not easy to secure the adhesiveness with the back sheet. This is because a fluororesin that constitutes the ePTFE has a property that is difficult to secure the adhesiveness with other member and the ePTFE is formed into porous body.

However, according to the manufacturing apparatus 100 and the manufacturing method of the present embodiment, the adhesiveness between the first and second reinforcement membranes 2 and 3 and the back sheets 2b and 3b may be relatively low when being supplied to the processing section 30. The adhesiveness between the first and second reinforcement membranes 2 and 3 and the back sheets 2b and 3b may be an extent where the first and second reinforcement membranes 2 and 3 and the back sheets 2b and 3b narrowly stick.

This is because even when the adhesivenesses between the first and second reinforcement membranes 2 and 3 and the back sheets 2b and 3b are low when being supplied to the processing section 30, by undergoing the thermocompression bonding step, the adhesiveness between both can be increased (more detailed below). Specifically, the adhesivenesses between the first and second reinforcement membranes 2 and 3 and the back sheets 2b and 3b when being supplied to the processing section 30 may be an extent that can obtain a measurement value of about 0.01 to 0.05 N/cm in the 90° peel test.

In the present embodiment, the back sheets 2b and 3b are formed from perfluoroalkoxy alkane (PFA) described below. In the case of the PFA described below, even when the first and second reinforcement membranes 2 and 3 are formed of the ePTFE, the adhesiveness that can secure at least the supporting property of the first and second reinforcement membranes 2 and 3 and the heat resistance that can withstand the thermocompression bonding step can be secured.

<PFA that forms back sheets 2b and 3b>
Elastic modulus: about 0.3 to 0.5 GPa
Thickness: about 45 to 55 μm
Surface roughness (Ra): about 100 to 200 μm
Maximum continuous operating temperature: about 250 to 270° C.

The processing section 30 while conveying the belt-like electrolyte polymer 1 in a longitudinal direction thereof, introduces each of the first and second reinforcement membranes 2 and 3 in each surfaces of the belt-like electrolyte polymer 1 by the thermocompression bonding and integrates the belt-like electrolyte polymer 1 and the first and second reinforcement membranes 2 and 3. In the processing section 30, a first sticking section 31, a first thermocompression bonding section 32, a first peel section 33, a second sticking section 34, a second thermocompression bonding section 35 and a second peel section 36 are disposed in this order in a conveying direction of the belt-like electrolyte polymer 1.

Figure 2:
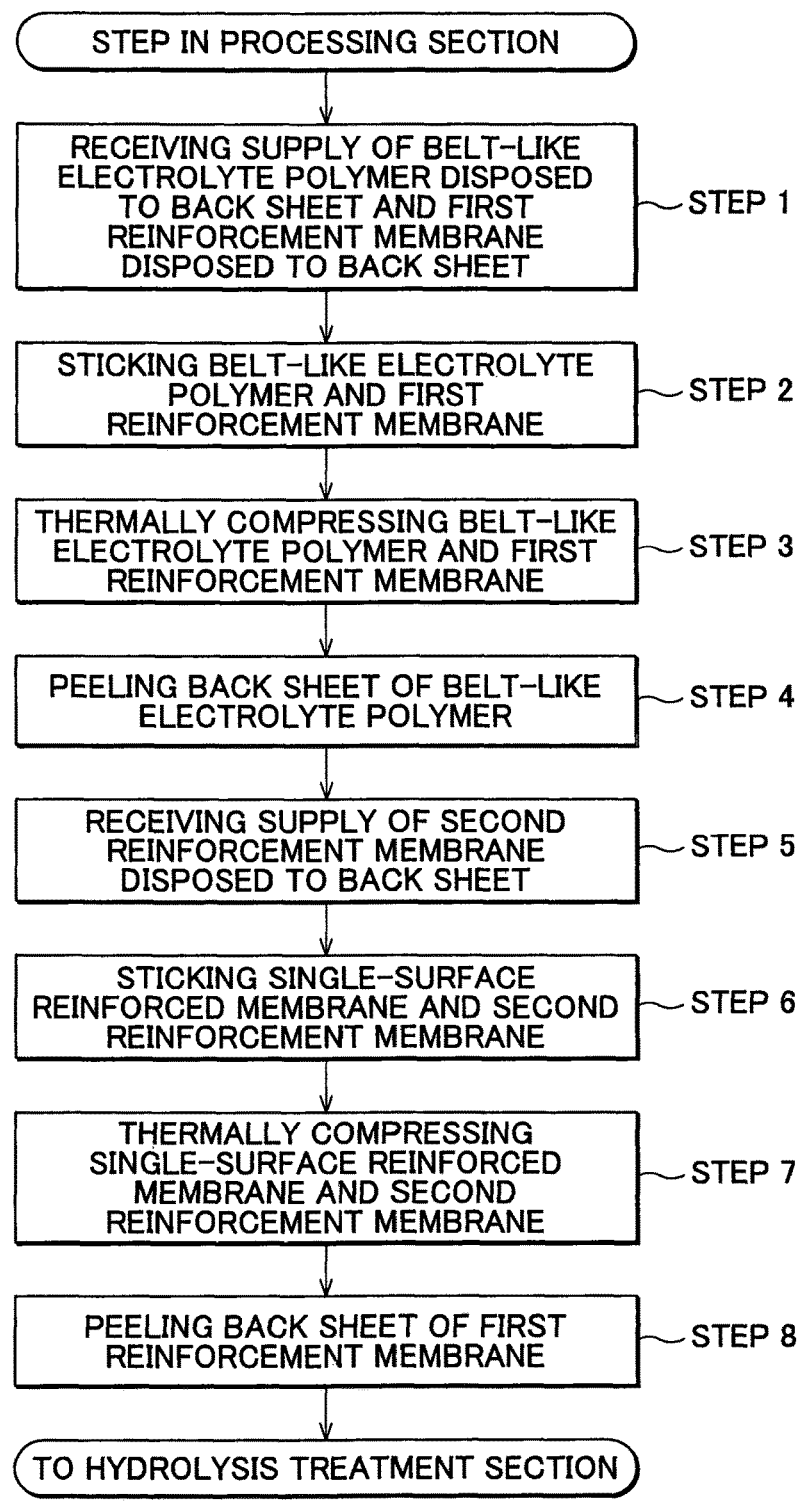
FIG. 2 is a process chart that shows a procedure of steps executed by a processing section.
Figure 3:
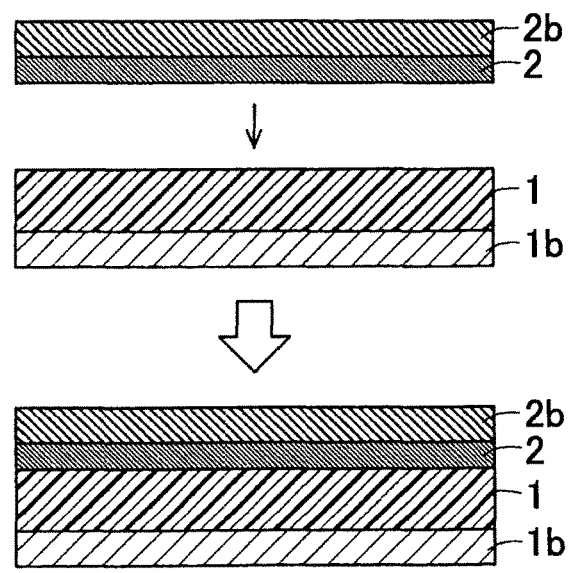
FIG. 3 is a schematic view that shows a step in a first sticking section.

FIG. 2 is a process chart that shows a procedure of steps that are executed in the processing section 30. FIG. 3 to FIG. 5 are schematic diagrams for explaining contents of the respective steps executed in the processing section 30 shown in FIG. 2. Each of FIG. 3 to FIG. 5 schematically illustrates a situation of a belt-like member that is being processed in the processing section 30 for every steps with a schematic cross sectional view when each of the belt-like members is cut in a width direction. Hereinafter, contents of steps in each of constituent sections 31 to 36 of the processing section 30 will be described sequentially with FIG. 1 and FIG. 2 to FIG. 5 as reference diagrams.

The processing section 30 receives a supply of the belt-like electrolyte polymer 1 disposed to the back sheet 1b from the electrolyte polymer supply section 10 and receives a supply of the first reinforcement membrane 2 disposed to the back sheet 2b from the first reinforcement membrane supply section 20 (step 1 of FIG. 2). The belt-like electrolyte polymer 1 and the first reinforcement membrane 2 are conveyed to the first sticking section 31.

FIG. 3 is a schematic view that shows a content of a step executed in the first sticking section 31. In the first sticking section 31, a pressing roller 31r bring the belt-like electrolyte polymer 1 and the first reinforcement membrane 2 into a surface contact with each other and into a close contact (step 2). The belt-like electrolyte polymer 1 and the first reinforcement membrane 2, which are stuck with each other are conveyed to the first thermocompression bonding section 32 in a state sandwiched between two sheets of the back sheets 1b and 2b.

FIG. 4 is a schematic view that shows contents of steps executed in the first thermocompression bonding section 32 and the first peel section 33. In the first thermocompression bonding section 32, the hot-roller 32r thermally compresses the belt-like electrolyte polymer 1 and the first reinforcement membrane 2 (step 3). In the step, an electrolyte polymer that forms the belt-like electrolyte polymer 1 is melted by thermal pressure due to the hot-roller 32r and impregnated into fine pores of the first reinforcement membrane 2. Thus, the first reinforcement membrane 2 is introduced to the inside of the belt-like electrolyte polymer 1 and the first reinforcement membrane 2 and the belt-like electrolyte polymer 1 are integrated. Hereinafter, the belt-like electrolyte polymer 1 that is integrated with the first reinforcement membrane 2 and one surface of which is reinforced is called a "single-surface reinforced membrane 1r".

The single-surface reinforced membrane 1r reeled out from the hot-roller 32r is conveyed to the first peel section 33 in a state sandwiched between two sheets of the back sheets 1b and 2b. The first peel section 33 peels and recovers the back sheet 1b from the single-surface reinforced membrane 1r by a peel roller 33r (step 4).

Herein, in the thermocompression bonding step, the electrolyte polymer of the belt-like electrolyte polymer 1 exudes up to between the first reinforcement membrane 2 and the back sheet 2b. More specifically, the electrolyte polymer of the belt-like electrolyte polymer 1 exudes to fine pores of the first reinforcement membrane 2 in an interface between the first reinforcement membrane 2 and the back sheet 2b. Then, since the exuded electrolyte polymer functions as an adhesive, the adhesiveness between the first reinforcement membrane 2 and the back sheet 2b becomes remarkably high. In addition, as described above, the adhesiveness between the belt-like electrolyte polymer 1 and the back sheet 1b is adjusted in advance to be lower than the adhesiveness between the first reinforcement membrane 2 and the back sheet 2b after reeled out of the hot-roller 32r.

Therefore, in the first peel section 33, the back sheet 1b can be peeled off from the single-surface reinforced membrane 1r in a state where the supporting property of the single-surface reinforced membrane 1r due to the back sheet 2b is secured. Accordingly, when the back sheet 1b is peeled, conveyance failure such that due to peeling off the back sheet 2b from the single-surface reinforced membrane 1r, the single-surface reinforced membrane 1r is damaged and degraded can be suppressed from occurring. The single-surface reinforced membrane 1r from which the back sheet 1b was peeled in the first peel section 33 is conveyed to the second sticking section 34.

FIG. 5 is a schematic view that shows contents of steps executed in each of the second sticking section 34, the second thermocompression bonding section 35 and the second peel section 36. The second sticking section 34 receives a supply of the second reinforcement membrane 3 with the back sheet 3b stuck thereon from the second reinforcement membrane supply section 21 (step 5). The second sticking section 34 brings a surface of the single-surface reinforced membrane 1r from which the back sheet 1b was peeled and the second reinforcement membrane 3 into surface contact with each other and into close contact by the pressing roller 34r (step 6). The single-surface reinforced membrane 1r and the second reinforcement membrane 3, which were stuck with each other and sandwiched by two sheets of the back sheets 2b and 3b are conveyed to the second thermocompression bonding section 35.

In the second thermocompression bonding section 35, the single-surface reinforced membrane 1r and the second reinforcement membrane 3 are thermocompression bonded by the hot-roller 35r (step 7). In this step, by the thermal pressure due to the hot-roller 32r, in the same manner as the step 3, the second reinforcement membrane 3 intrudes into the inside of the single-surface reinforced membrane 1r and the single-surface reinforced membrane 1r and the second reinforcement membrane 3 are integrated. Hereinafter, the belt-like electrolyte polymer 1 in which the second reinforcement membrane 3 is integrated therewith in the second thermocompression bonding section 35 and both surfaces thereof are reinforced by the first and second reinforcement membranes 2 and 3 is called as a "both-surface reinforced membrane 1rr".

The both-surface reinforced membrane 1rr reeled out from the hot-roller 35r is, in a state sandwiched by two sheets of back sheets 2b and 3b, conveyed to the second peel section 36. In the second peel section 36, the peel roller 36r peels and recovers the back sheet 2b on the side of the first reinforcement membrane 2 from the both-surface reinforced membrane 1rr (step 8). The both-surface reinforced membrane 1rr in a state supported by the back sheet 3b is conveyed to a hydrolysis treatment section 40. The back sheet 3b may be replaced with another back sheet suitable for the hydrolysis treatment before being conveyed to the hydrolysis treatment section 40.

Figures 6, 7:
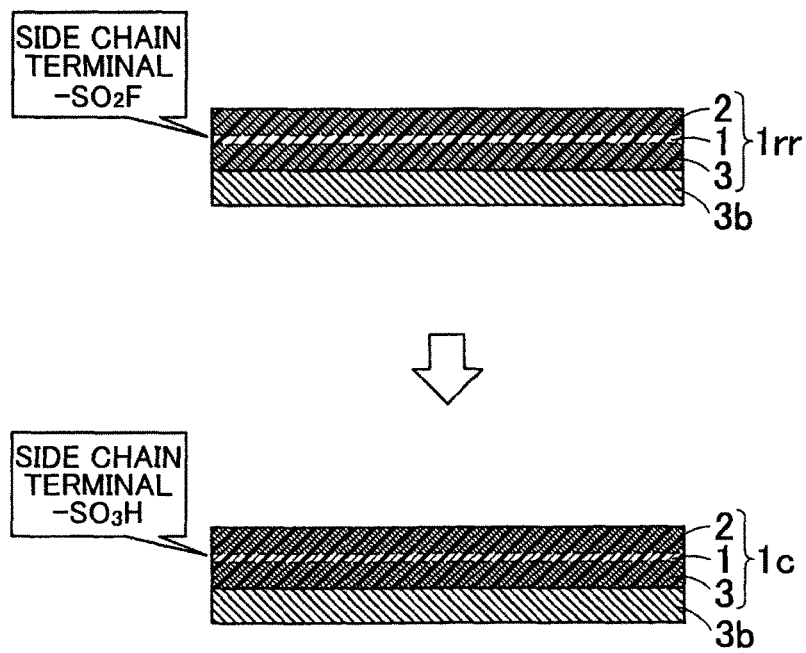
FIG. 6 is a schematic view that shows steps in a hydrolysis treatment section.
FIG. 7 is an explanatory view that shows a table where results of a performance evaluation test of samples of a reinforced electrolyte membrane are summarized.

FIG. 6 is a schematic view similar to FIG. 3 to FIG. 5, which shows steps in the hydrolysis treatment section 40. In the hydrolysis treatment section 40, the hydrolysis treatment is applied to the reinforced double-sided membrane 1rr, the protonic conductivity is imparted to the electrolyte polymer of the both-surface reinforced membrane 1rr, and a reinforced electrolyte membrane 1c is completed thereby. A specific content of the hydrolysis treatment is as shown below. The both-surface reinforced membrane 1rr is dipped in an alkaline solution and a —$SO_2F$ group that is a side chain terminal that the electrolyte polymer has is modified into a —$SO_3Na$ group. Then, after cleansing the both-surface reinforced membrane 1rr with water, the resultant is dipped in an acidic solution, the —$SO_3Na$ group modified in the preceding step is further modified into a —$SO_3H$ group.

As shown above, according to the manufacturing apparatus 100 and the manufacturing method of the present embodiment, the belt-like electrolyte polymer 1 and the first and second reinforcement membranes 2 and 3 are conveyed in a state each thereof is supported by the back sheets 1b, 2b and 3b, respectively. Therefore, the belt-like electrolyte polymer 1 and the first and second reinforcement membranes 2 and 3 can be suppressed from being damaged and degraded due to conveyance. In particular, according to the manufacturing apparatus 100 of the present embodiment, even when the first and second reinforcement membranes 2 and 3 are formed from the ePTFE that generates strain only by imparting a tensile stress of 2.0 N or less, the damage and degradation thereof can be suppressed from occurring.

Further, according to the manufacturing apparatus 100 and the manufacturing method of the present embodiment, when the back sheet 1b is peeled off from the single-surface reinforced membrane 1r, the supporting property of the single-surface reinforced membrane 1r is secured because the adhesiveness between the back sheet 2b on the other side and the single-surface reinforced membrane 1r is secured. Therefore, the conveyance failure accompanying the peeling of the back sheet 1b can be suppressed from occurring.

FIG. 7 is an explanatory diagram that shows a table in which results of performance evaluation test of samples of the reinforced electrolyte membrane are summarized. The inventors of the present invention prepared samples s1 to s4 of reinforced electrolyte membrane with reinforcement membranes in which the neck-in is generated in mock during conveyance. In order to evaluate the performance of each of the samples s1 to s4, dimensional change rates due to swelling and the limited number of cycles were measured.

"A frequency of neck-in" in the respective samples s1 to s4 in FIG. 7 is a dimensional shrinkage rate in a width direction (TD direction) of each of the reinforcement membranes when tensile stress is imparted in a longitudinal direction (MD direction) to the reinforcement membranes of each of the samples s1 to s4 before the respective samples s1 to s4 are prepared and the neck-in is generated. The frequency of the neck-in represents the frequency of the neck-in generated in the reinforcement membrane of each of the samples s1 to s4.

The dimensional change rate due to swelling was measured as shown below.

[1] Each of samples s1 to s4 cut into an 8 cm square is disposed under a drying environment (temperature: 25° C., relative humidity: 50% RH) that is a reference condition and a dimension in the TD direction was measured. Hereinafter, the dimension measured at this time is called as a "dry dimension".

[2] Next, each of the samples s1 to s4 was dipped and swollen in a hot water at 100° C. for 1 hour and, after this, a dimension in the TD direction was measured. Hereinafter, the dimension measured at this time is called as a "swelling dimension".

[3] With a measurement value X of the dry dimension and a measurement value Y of the swelling dimension, a dimensional change rate R due to the swelling was calculated according to the following formula (A).

$$\text{Dimensional change rate } R\ (\%) = 100(Y/X) - 100 \tag{A}$$

The limited number of cycles was measured as shown below in a dry and wet endurance test of each of membrane-electrode assemblies prepared with each of the samples s1 to s4.

<Method of Preparing Membrane-Electrode Assembly>
[1] On both surfaces of each of the samples s1 to s4, a dispersion solution of a catalyst supporting carbon and a fluorinated ionomer was coated by a spraying method and a catalyst electrode was formed thereby.
[2] On the catalyst electrode of each of the samples s1 to s4, a carbon fiber base material was disposed as a gas diffusion layer.

<Condition of Dry and Wet Endurance Test>
[1] While alternatively supplying a wet nitrogen gas and a dry nitrogen gas by alternately switching at a 5 minute period to the membrane-electrode assembly of each of samples s1 to s4, at a predetermined timing, gas permeability of each of the samples s1 to s4 was detected.
[2] When the gas permeation amount (cross leakage amount) measured in a gas permeability inspection becomes a specified value or more, the number of cycles by which the supply of the wet nitrogen gas and the supply of the dry nitrogen gas were switched until then was acquired as the limited number of cycles.

The dimensional change rate R due to the swelling became larger as a sample has a larger frequency of the neck-in. This is because the larger the frequency of the neck-in is, the lower the strength of the reinforcement membrane in the TD direction became. Further, in the dry and wet endurance test, as a sample has a larger frequency of neck-in, the limited number of cycles became smaller. This is because when a sample has the larger frequency of neck-in, due to degradation of the strength of the reinforcement membrane, a change amount of swelling and shrinkage due to a change of the dry and wet state became larger.

As described above, it was confirmed by experiment that the larger the frequency of neck-in generated in the reinforcement membrane during conveyance is, the larger the possibility of degradation of performance of the reinforced electrolyte membrane is. Therefore, in the step of manufacturing the reinforced electrolyte membrane, like in the manufacturing apparatus 100 of the present embodiment, the reinforcement membrane is desirable to be conveyed in a state supported by the back sheet.

FIG. 8 is an explanatory diagram that shows a table in which results measured by the 90° peel test of the adhesivenesses between the respective members in the manufacturing process in the manufacturing apparatus 100 are summarized. FIG. 9 is a schematic view that describes a method of the 90° peel test. The adhesivenesses between the respective members in the manufacturing process in the manufacturing apparatus 100 when the first reinforcement membrane 2 and two back sheets 1b and 2b are formed with materials shown below were confirmed by the 90° tensile test. The elastic modulus is a value measured with Nanointender G200 manufactured by Toyo Corporation. Further, the surface roughness (Ra) is a value measured with a laser microscope OLS4000 manufactured by Olympus Corporation.

<First Reinforcement Membrane 2>
Material: ePTFE
<Back Sheet 1b of Belt-Like Electrolyte Polymer 1>
Material: PTFE
Elastic Modulus: 0.4 GPa
Thickness: 50 μm
Surface roughness (Ra): 1000 nm
Maximum Continuous Operating Temperature: 260° C.
<Back Sheet 2b of First Reinforcement Membrane 2>
Material: PFA
Elastic Modulus: 0.4 GPa
Thickness: 50 μm
Surface roughness (Ra): 160 nm
Maximum Continuous Operating Temperature: 260° C.

Before supplying to the processing section 30, the belt-like electrolyte polymer 1 and the back sheet 1b were stuck under the condition shown below. Further, also the first reinforcement membrane 2 and the back sheet 2b were stuck under the similar condition.
Temperature: 25° C.
Pressing force: 0.4 MPa
Pressing time: 10 minutes In the first sticking section 31, the first reinforcement membrane 2 and the belt-like electrolyte polymer 1 were stuck under the following condition.
Temperature: 25° C.
Pressing force: 0.4 MPa
Pressing time: 10 minutes In the first thermocompression bonding section 32, the first reinforcement membrane 2 and the belt-like electrolyte polymer 1 were thermocompression bonded under the following condition.
Temperature: 230° C.
Pressing force: 0.5 MPa
Pressing time: 10 minutes <Content of 90° Peel Test>
In the 90° peel test, membrane members A and B that are test subjects were stuck with each other, the membrane member A was fixed on a base, and a pull force when one end of the partially peeled membrane member B is pulled in a vertical upper direction is measured (FIG. 9). Measured values of the adhesiveness in FIG. 9 are measurement values obtained by the 90° peel test of samples having a width of 1 cm and a length of 10 cm cut out of combinations of the respective materials A and B in FIG. 9.

As the result of the 90° peel test, the adhesiveness between the first reinforcement membrane 2 (ePTFE) and the back sheet 2b (PFA) when supplied to the processing section 30 from the first reinforcement membrane supply section 20 was 0.02 N/cm. On the other hand, the adhesiveness between the belt-like electrolyte polymer 1 and the back sheet 1b (PTFE) when supplied to the processing section 30 from the electrolyte polymer supply section 10 was 1.0 N/cm. Further, the adhesiveness between the belt-like electrolyte polymer 1 and the first reinforcement membrane 2 (ePTFE) after sticking in the first sticking section 31 was 0.1 N/cm.

The adhesiveness between the single-surface reinforced membrane 1r and the back sheet 2b (PFA) after undergoing the thermocompression bonding step in the first thermocompression bonding section 32 was 1.4 N/cm and became a value remarkably higher than that of the pre-step of the thermocompression bonding step. On the other hand, the adhesiveness between the single-surface reinforced membrane 1r and the back sheet 1b (PTFE) after undergone the thermocompression bonding step was 1.2 N/cm, that is, the adhesiveness was only slightly improved by the thermocompression bonding step.

Like this, when undergoing the thermocompression bonding step, the adhesiveness between the first reinforcement membrane 2 and the back sheet 2b became remarkably high and higher than the adhesiveness between the belt-like electrolyte polymer 1 and the back sheet 1b. This is, as was described above, because the electrolyte polymer exuded between the first reinforcement membrane 2 and the back sheet 2b functioned as an adhesive. As a result, the adhesiveness between the belt-like electrolyte polymer 1 and the back sheet 1b thereof became higher than the adhesiveness between the single-surface reinforced membrane 1r and the back sheet 1b.

As described above, according to the manufacturing apparatus 100 and the manufacturing method of the present embodiment, since, in the first peel section 33, the adhesiveness between the single-surface reinforced membrane 1r and the back sheet 1b becomes high, the back sheet 1b can be easily peeled off from the single-surface reinforced membrane 1r. Therefore, the conveyance failure accompanying the peeling of the back sheet 1b can be suppressed from occurring.

B. Second Embodiment

Figure 10:
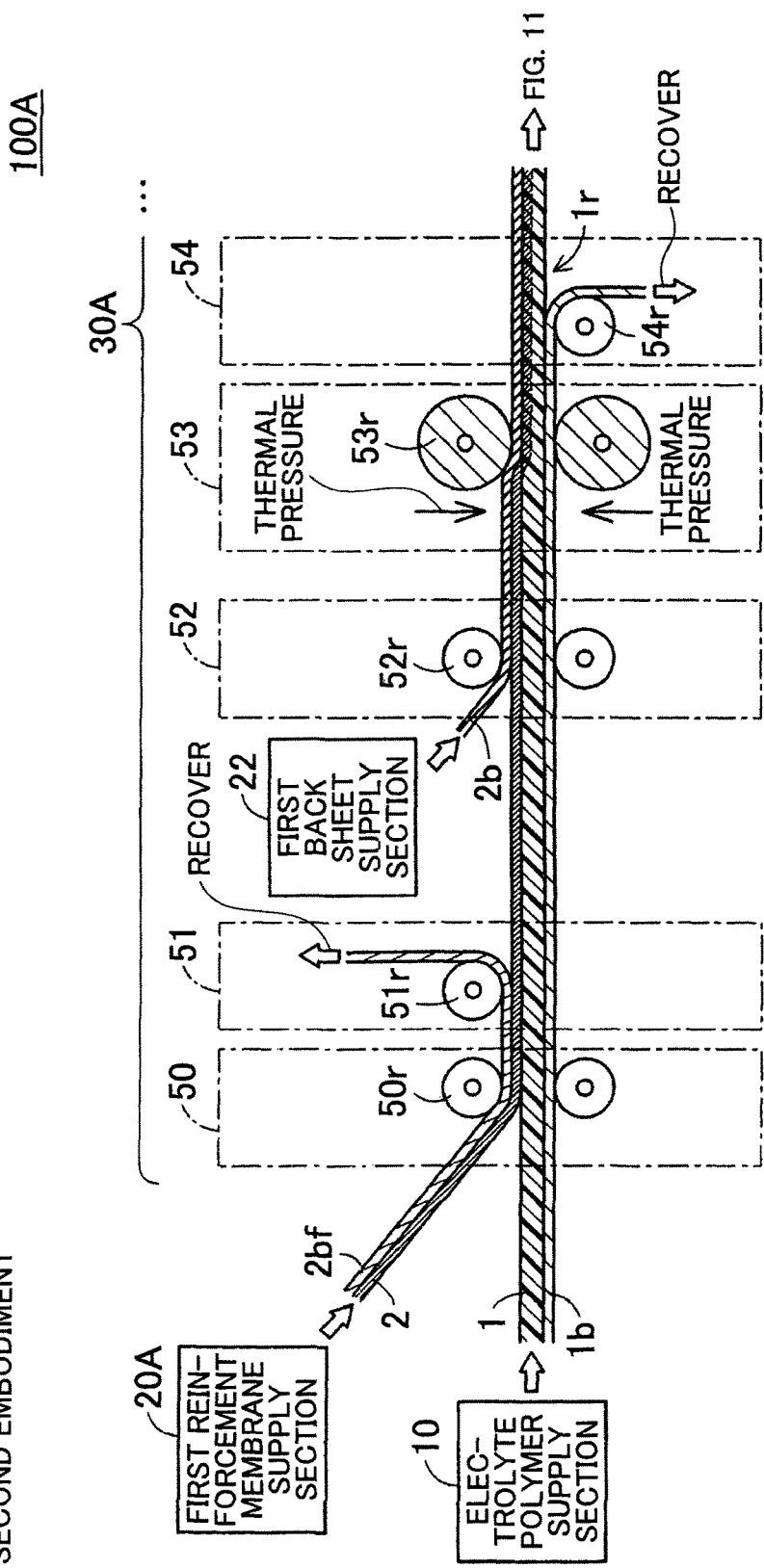
FIG. 10 is a schematic diagram that shows a structure of a manufacturing apparatus of manufacturing a reinforced electrolyte membrane according to a second embodiment.
Figure 11:
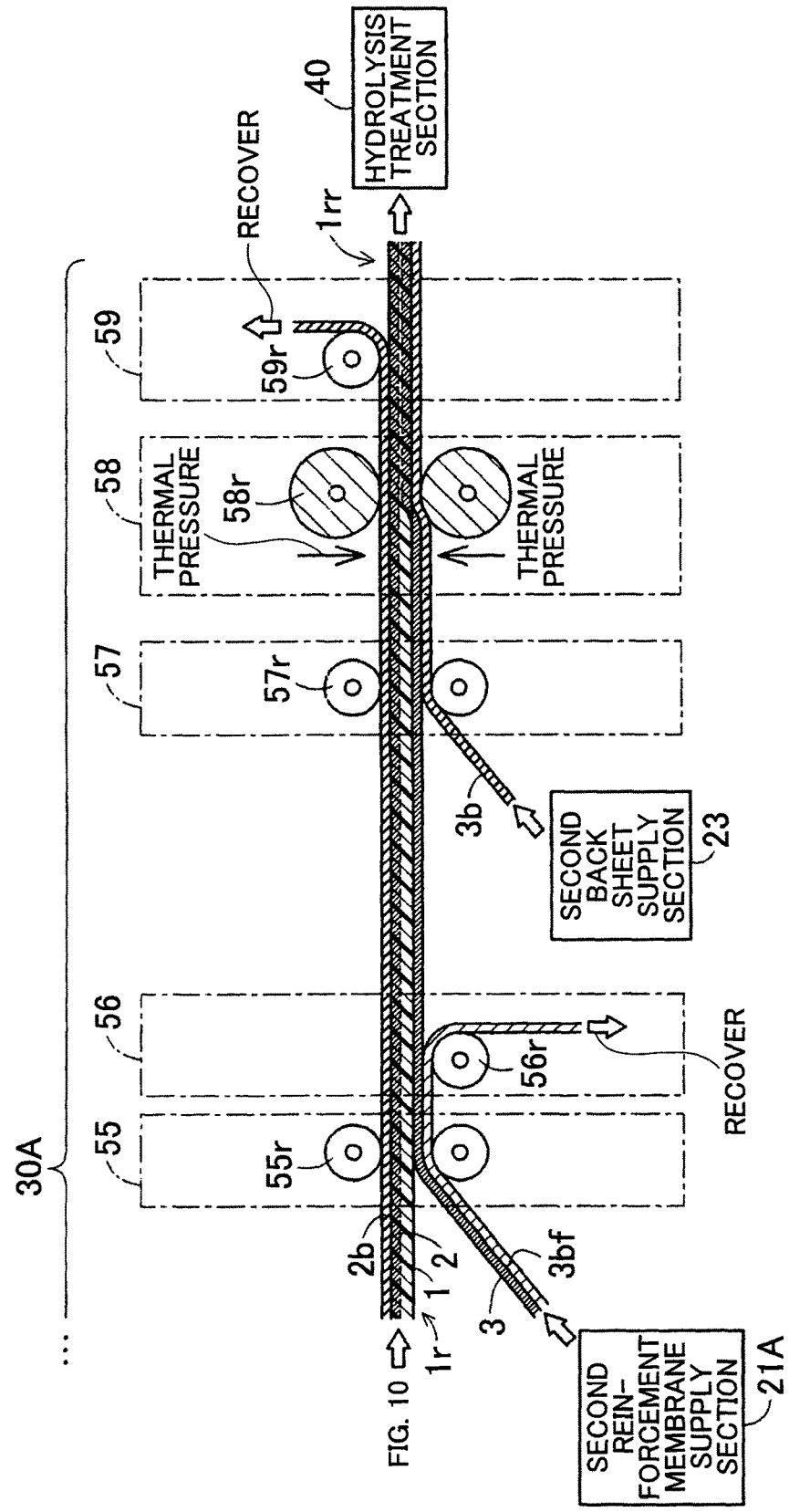
FIG. 11 is a schematic view that shows a structure of a manufacturing apparatus of manufacturing a reinforced electrolyte membrane according to a second embodiment.

FIG. 10 and FIG. 11 are schematic views that show a structure of a manufacturing apparatus 100A of manufacturing a reinforced electrolyte membrane as the second embodiment of the present invention. In each of FIG. 10 and FIG. 11, a pre-stage side and a post-stage side of the manufacturing apparatus 100A are shown separately for convenience sake. In the manufacturing apparatus 100A according to the second embodiment, before the thermocompression bonding of the first and second reinforcement membranes 2 and 3 to the belt-like electrolyte polymer 1, the back sheets of the first and second reinforcement membranes 2 and 3 are replaced.

The manufacturing apparatus 100A of the second embodiment includes an electrolyte polymer supply section 10, first and second reinforcement membrane supply sections 20A and 21A, first and second back sheet supply sections 22 and 23, a processing section 30A and a hydrolysis treatment section 40. The electrolyte polymer supply section 10 has a similar structure as that described in the first embodiment and supplies the belt-like electrolyte polymer 1 disposed to the back sheet 1b to the processing section 30A. The belt-like electrolyte polymer 1 and the back sheet 1b are formed from materials the same as that described in the first embodiment.

Each of the first and second reinforcement membrane supply sections 20A and 21A has the similar structure as the first and second reinforcement membrane supply sections 20 and 21 described in the first embodiment except that the back sheets of the first and second reinforcement membranes 2 and 3 supplied to the processing section 30A are different. Each of the first and second reinforcement membrane supply sections 20A and 21A supplies the first and second reinforcement membranes 2 and 3 disposed to the supply back sheets 2bf, 3bf to the processing section 30A. The first and second reinforcement membranes 2 and 3 are the same as those described in the first embodiment and are formed with porous membrane member such as the ePTFE.

In the second embodiment, the supply back sheets 2bf, 3bf to which each of the first and second reinforcement membranes 2 and 3 is disposed are formed with a resin member having stiffness higher than that of the back sheets 2b and 3b described in the first embodiment. Therefore, distortion and degradation such as the neck-in can be more surely suppressed from occurring in the first and second reinforcement membranes 2 and 3 during conveying to the processing section 30A.

The supply back sheets 2bf, 3bf are formed of, for example, polyethylene terephthalate (PET) described below. When the following PET is used, even when the first and second reinforcement membranes 2 and 3 are formed from the ePTFE that is difficult to obtain the adhesiveness with the resin material, the adhesiveness that can secure at least the supporting property can be secured.

<PET that Forms Back Sheets 2bf and 3bf>
Elastic modulus: about 3 to 5 GPa
Thickness: about 30 to 50 μm
Surface roughness (Ra): about 20 to 40 nm Herein, the adhesiveness between the first reinforcement membrane 2 and the supply back sheet 2bf is adjusted to be lower than the adhesiveness between the belt-like electrolyte polymer 1 and the back sheet 1b and the adhesiveness between the first reinforcement membrane 2 and the belt-like electrolyte polymer 1 before being thermocompression bonded. Further, the adhesiveness between the second reinforcement membrane 3 and the supply back sheet 3bf is adjusted to be lower than the adhesiveness between the single-surface reinforced membrane 1r and the back sheet 2b. The reason for this will be described below.

Thus, the adhesivenesses between the first and second reinforcement membranes 2 and 3 and the supply back sheets 2bf, 3bf may be relatively low. Specifically, the adhesivenesses between the first and second reinforcement membranes 2 and 3 and the supply back sheets 2bf, 3bf may be an extent that can obtain measurement results of 0.01 to 0.03 N/cm in the 90° peel test.

Further, as described below, in the manufacturing apparatus 100A of the second embodiment, the supply back sheets 2bf, 3bf are replaced by the back sheets 2b and 3b which have high heat resistance, before the thermocompression bonding step. Therefore, the supply back sheets 2bf, 3bf may be formed of a material having low heat resistance.

Each of the first and second back sheet supply sections 22 and 23 supplies back sheets 2b and 3b for the replacing to the processing section 30A. The back sheets 2b and 3b are desirable to have the heat resistance to an extent that can withstand a heating temperature in the thermocompression bonding step and may be the same as that was stuck to the first and second reinforcement membranes 2 and 3 in the first embodiment. Hereinafter, the back sheets 2b and 3b are particularly referred to as "heat-resistant back sheets 2b and 3b".

The processing section 30A, after the supply back sheets 2bf, 3bf of the first and second reinforcement membranes 2 and 3 are replaced with the heat resistant back sheets 2b and 3b, integrates the first and second reinforcement membranes 2 and 3 and the belt-like electrolyte polymer 1 by thermocompression bonding. The processing section 30A includes a first sticking section 50, a first peel section 51, a second sticking section 52, a first thermocompression bonding section 53, a second peel section 54, a third sticking section 55, a third peel section 56, a fourth sticking section 57, a second thermocompression bonding section 58, and a fourth peel section 59, which are arranged in this order in a conveying direction of the belt-like electrolyte polymer 1.

Figure 12:
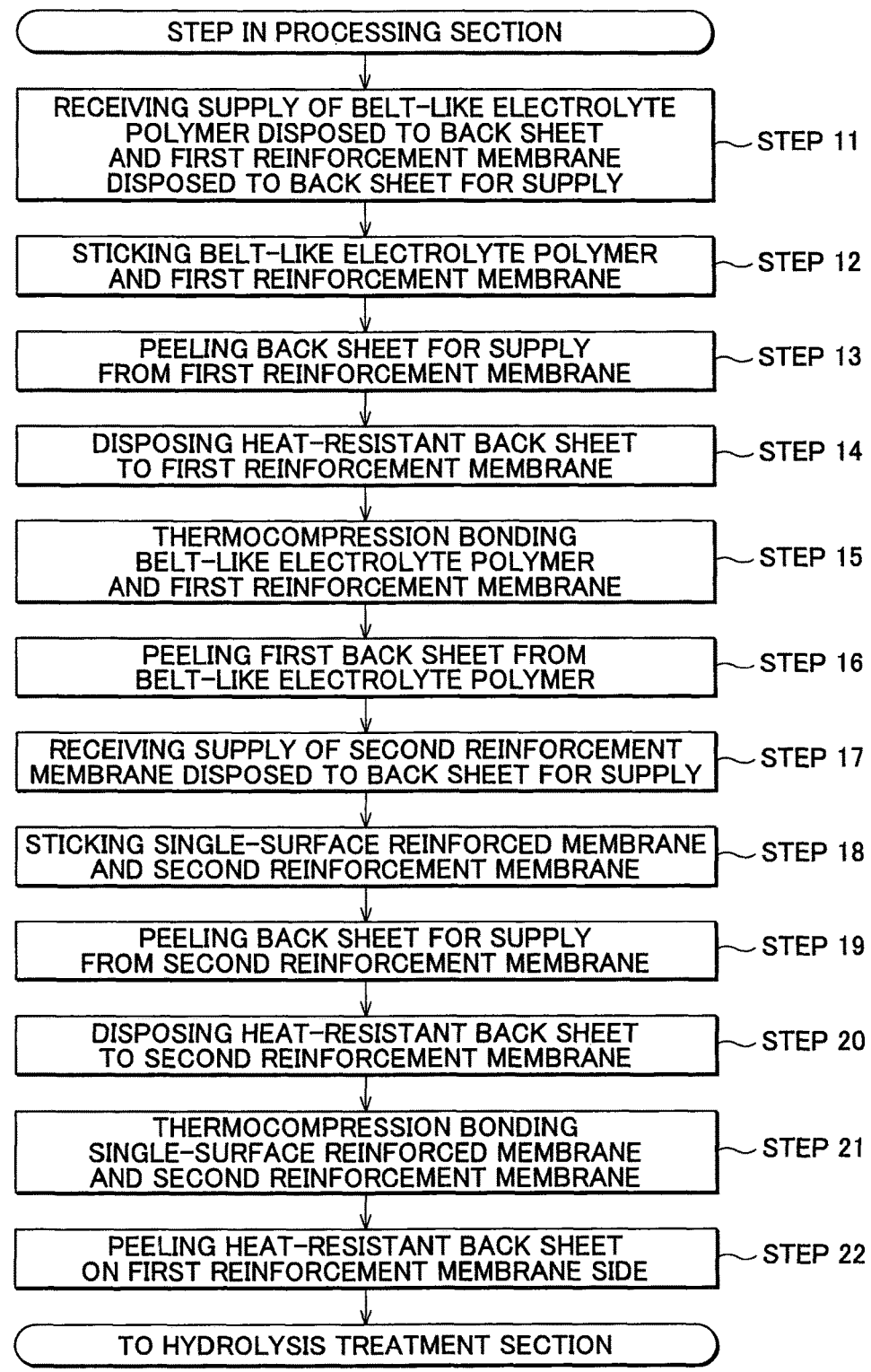
FIG. 12 is a process chart that shows a procedure of steps executed by a processing section of the second embodiment.

FIG. 12 is a process chart that shows a procedure of steps executed in the processing section 30A of the second embodiment. FIG. 13 to FIG. 16 are schematic diagrams that describe contents of each of steps executed in the processing section 30A shown in FIG. 12. In each of FIG. 13 to FIG. 16, a state of the belt-like member that is being processed in the processing section 30A of the second embodiment is schematically illustrated for each of the steps by a schematic sectional view when each of the belt-like members is cut in a width direction. Hereinafter, contents of steps executed in each of the constituent sections 50 to 59 of the processing section 30A of the second embodiment will be sequentially described with reference to FIG. 10, FIG. 11 and FIG. 12 to FIG. 16.

The processing section 30A receives a supply of the belt-like electrolyte polymer 1 disposed to the back sheet 1b from the electrolyte polymer supply section 10 and receives a supply of the first reinforcement membrane 2 disposed to the supply back sheet 2bf (step 11 of FIG. 12) from the first reinforcement membrane supply section 20A. The belt-like electrolyte polymer 1 and the first reinforcement membrane 2 are conveyed to the first sticking section 50.

FIG. 13 is a schematic view that shows contents of steps in the first sticking section 50 and the first peel section 51. The first sticking section 50 brings the belt-like electrolyte polymer 1 and the first reinforcement membrane 2 into surface contact with each other and into close contact by the pressing roller 50r (step 12). The first sticking section 50 pressurizes by the pressing roller 50r such that the adhesiveness between the belt-like electrolyte polymer 1 and the first reinforcement membrane 2 becomes higher at least than the adhesiveness between the first reinforcement membrane 2 and the supply back sheet 2bf. The adhesiveness between the belt-like electrolyte polymer 1 and the first reinforcement membrane 2 after pressurized in the first sticking section 50 may be an extent that can obtain a measurement value of 0.05 to 0.15 N/cm in the 90° peel test.

The belt-like electrolyte polymer 1 and the first reinforcement membrane 2, which are stuck with each other, are conveyed to the first peel section 51 in a state sandwiched between two sheets of back sheets 1b and 2bf. The first peel section 51 peels and recovers the supply back sheet 2bf from a surface of the first reinforcement membrane 2 by the peel roller 51r (step 13). As described above, the adhesiveness between the first reinforcement membrane 2 and the supply back sheet 2bf is adjusted to be lower than the adhesiveness between the belt-like electrolyte polymer 1 and the back sheet 1b and the adhesiveness between the first reinforcement membrane 2 and the belt-like electrolyte polymer 1. That is, at this stage, the adhesiveness between the first reinforcement membrane 2 and the supply back sheet 2bf is smaller than the adhesivenesses between other members. Therefore, the supply back sheet 2bf can be readily peeled off from the first reinforcement membrane 2.

The first reinforcement membrane 2 and the belt-like electrolyte polymer 1 after the supply back sheet 2bf was peeled are conveyed to the second sticking section 52 in a state disposed to the back sheet 1b. At this time, since the first reinforcement membrane 2 is supported by the belt-like electrolyte polymer 1 and the back sheet 1b, the conveyance failure such as the neck-in can be suppressed from occurring.

FIG. 14 is a schematic diagram that shows contents of steps in the second sticking section 52, the first thermocompression bonding section 53, and the second peel section 54. The second sticking section 52 receives a supply of the heat-resistant back sheet 2b from the first back sheet supply section 22 and sticks the back sheet 2b on a surface of the first reinforcement membrane 2 by the pressing roller 52r (step 14).

As described above, since the first reinforcement membrane 2 is supported by the belt-like electrolyte polymer 1 and the back sheet 1b thereof, the adhesiveness between the heat-resistant back sheet 2b and the first reinforcement membrane 2 imparted in the second sticking section 52 may be relatively low. Specifically, the adhesiveness between the heat-resistant back sheet 2b and the first reinforcement membrane 2 may be an extent to be able to obtain a measurement result of 0.01 to 0.03 N/cm in the 90° peel test. The belt-like electrolyte polymer 1 and the first reinforcement membrane 2 are conveyed to the first thermocompression bonding section 53 in a state sandwiched between two back sheets 1b and 2b having high heat resistance.

The first thermocompression bonding section 53 thermally compresses the belt-like electrolyte polymer 1 and the first reinforcement membrane 2 by the hot-roller 53r and produces the single-surface reinforced membrane 1r (step 15). As described also in the first embodiment, in the thermocompression bonding section, the electrolyte polymer exudes between the first reinforcement membrane 2 and the heat-resistant back sheet 2b. Therefore, the adhesiveness between the first reinforcement membrane 2 and the heat-resistant back sheet 2b becomes remarkably high and becomes higher than the adhesiveness between the belt-like electrolyte polymer 1 and the back sheet 1b. The single-surface reinforced membrane 1r is conveyed in a state sandwiched between two back sheets 1b and 2b to the second peel section 54.

The second peel section 54 peels and recovers the back sheet 1b from the single-surface reinforced membrane 1r by the peel roller 54r (step 16). As described above, since the adhesiveness between the first reinforcement membrane 2 and the heat-resistant back sheet 2b is remarkably high, in the second peel section 54, the back sheet 1b can be peeled in a state where the supporting property of the single-surface reinforced membrane 1r is secured. The single-surface reinforced membrane 1r from which the back sheet 1b was peeled is conveyed to the third sticking section 55 in a state supported by the heat-resistant back sheet 2b.

FIG. 15 is a schematic diagram that shows contents of steps in the third sticking section 55 and the third peel section 56. The third sticking section 55 receives a supply of the second reinforcement membrane 3 disposed to the supply back sheet 3bf from the second reinforcement membrane supply section 21A (step 17). Then, the third sticking section 55 brings the second reinforcement membrane 3 into close contact with an exposed surface (a surface on a side opposite to the first reinforcement membrane 2) of the single-surface reinforced membrane 1r by the pressing roller 55r (step 18). The pressing condition in the third sticking section 55 and the pressing condition in the first sticking section 50 may be the same.

The third peel section 56 peels the supply back sheet 3bf from the second reinforcement membrane 3 by the peel roller 56r (step 19). As described above, the adhesiveness between the second reinforcement membrane 3 and the supply back sheet 3bf is adjusted to be lower than the adhesiveness between the second reinforcement membrane 3 and the single-surface reinforced membrane 1r that is imparted in the third sticking section 55. Therefore, the supply back sheet 3bf can be readily peeled and the conveyance failure accompanying the peel of the supply back sheet 3bf can be suppressed from occurring. The single-surface reinforced membrane 1r from which the supply back sheet 3bf is peeled is conveyed to the fourth sticking section 57.

FIG. 16 is a schematic diagram that shows contents of steps in the fourth sticking section 57, the second thermocompression bonding section 58 and the fourth peel section 59. The fourth sticking section 57 receives a supply of the heat-resistant back sheet 3b from the second back sheet supply section 23, and sticks the back sheet 3b with a surface of the first reinforcement membrane 2 by the pressing roller 57r (step 20). The pressing condition in the fourth sticking section 57 may be the same as the pressing condition in the second sticking section 52. The single-surface reinforced membrane 1r to which the second reinforcement membrane 3 is stuck is conveyed to the second thermocompression bonding section 58 in a state sandwiched between two heat-resistant back sheets 2b and 3b.

The second thermocompression bonding section 58 thermally compresses the single-surface reinforced membrane 1r and the second reinforcement membrane 3 by the hot roller 58r to produce a both-surface reinforced membrane 1rr (step 21). The both-surface reinforced membrane 1rr is conveyed to the fourth peel section 59 in a state sandwiched by the two heat-resistant back sheets 2b and 3b. The fourth peel section 59 peels the heat-resistant back sheet 2b disposed on a side of the first reinforcement membrane 2 from the both-surface reinforced membrane 1rr by the peel roller 59r (step 22).

The both-surface reinforced membrane 1rr is conveyed to the hydrolysis treatment section 40 in a state supported by the heat-resistant back sheet 3b. The hydrolysis treatment section 40 imparts the proton conductivity to the both-surface reinforced membrane 1rr and the reinforced electrolyte membrane is completed thereby. The step executed in the hydrolysis treatment section 40 is the same as that described in the first embodiment (FIG. 6).

As described above, in the manufacturing apparatus 100A of the second embodiment, the back sheet 2bf and 3bf for supply of the first and second reinforcement membranes 2 and 3 are replaced with the heat-resistant back sheets 2b and 3b before the thermocompression bonding step in the processing section 30A. Therefore, according to the manufacturing apparatus 100A of the second embodiment, a material having low heat-resistant can be used as the supply back sheets 2bf, 3bf of the first and second reinforcement membranes 2 and 3, and a range of selection of a back sheet material can be expanded.

FIG. 17 is an explanatory diagram that shows a table in which results measured by the 90° peel test of the adhesivenesses between the respective members before peeling the supply back sheet 2bf in the first peel section 51 of the processing section 30A. In the experiment, the belt-like electrolyte polymer 1, the back sheet 2b thereof, and the first reinforcement membrane 2 were formed from same materials as those in the 90° tensile test described in FIG. 8. Further, the supply back sheet 2bf is formed from materials shown below. The elastic modulus is a measurement value by Nanointender G200 manufactured by Toyo Corporation and the surface roughness (Ra) is a measurement value by Laser Microscope OLS4000 manufactured by Olympus Corporation.

<Back Sheet 2bf for Supply>
Material: PET
Elastic modulus: 4 GPa
Thickness: 38 μm
Surface roughness (Ra): 30 nm The first reinforcement membrane 2 and the supply back sheet 2bf were stuck under the following condition before being supplied to the processing section 30A.

Temperature: 25° C.
Pressing force: 0.4 MPa
Pressing time: 10 minutes

In the first sticking section 50, the belt-like electrolyte polymer 1 and the first reinforcement membrane 2 were stuck under the following condition.
Temperature: 25° C.
Pressing force: 0.4 MPa
Pressing time: 10 minutes The 90° peel test was performed under the condition the same as that of the 90° tensile test described in FIG. 8. As a result, the adhesiveness between the first reinforcement membrane 2 (ePTFE) and the supply back sheet 2bf (PET) when being supplied to the processing section 30A was 0.02 N/cm. Even after the pressing step at the first sticking section 50, the adhesiveness between the first reinforcement membrane 2 (ePTFE) and the supply back sheet 2bf (PET) was hardly different.

On the other hand, the adhesiveness between the belt-like electrolyte polymer 1 and the first reinforcement membrane 2 (ePTFE) before the supply back sheet 2bf is peeled in the first peel section 51 was 0.1 N/cm. Further, the adhesiveness between the belt-like electrolyte polymer 1 and the back sheet 2b (PTFE) was 1.0 N/cm.

Thus, when the ePTFE is used as the first reinforcement membrane 2, if the PET such as described above is used as the supply back sheet 2bf, in the first peel section 51, the adhesiveness between the first reinforcement membrane 2 and the supply back sheet 2bf becomes smaller than the adhesiveness between other belt-like members. Therefore, the supply back sheet 2bf can be readily peeled off from the first reinforcement membrane 2.

C. Third Embodiment

Figure 18:
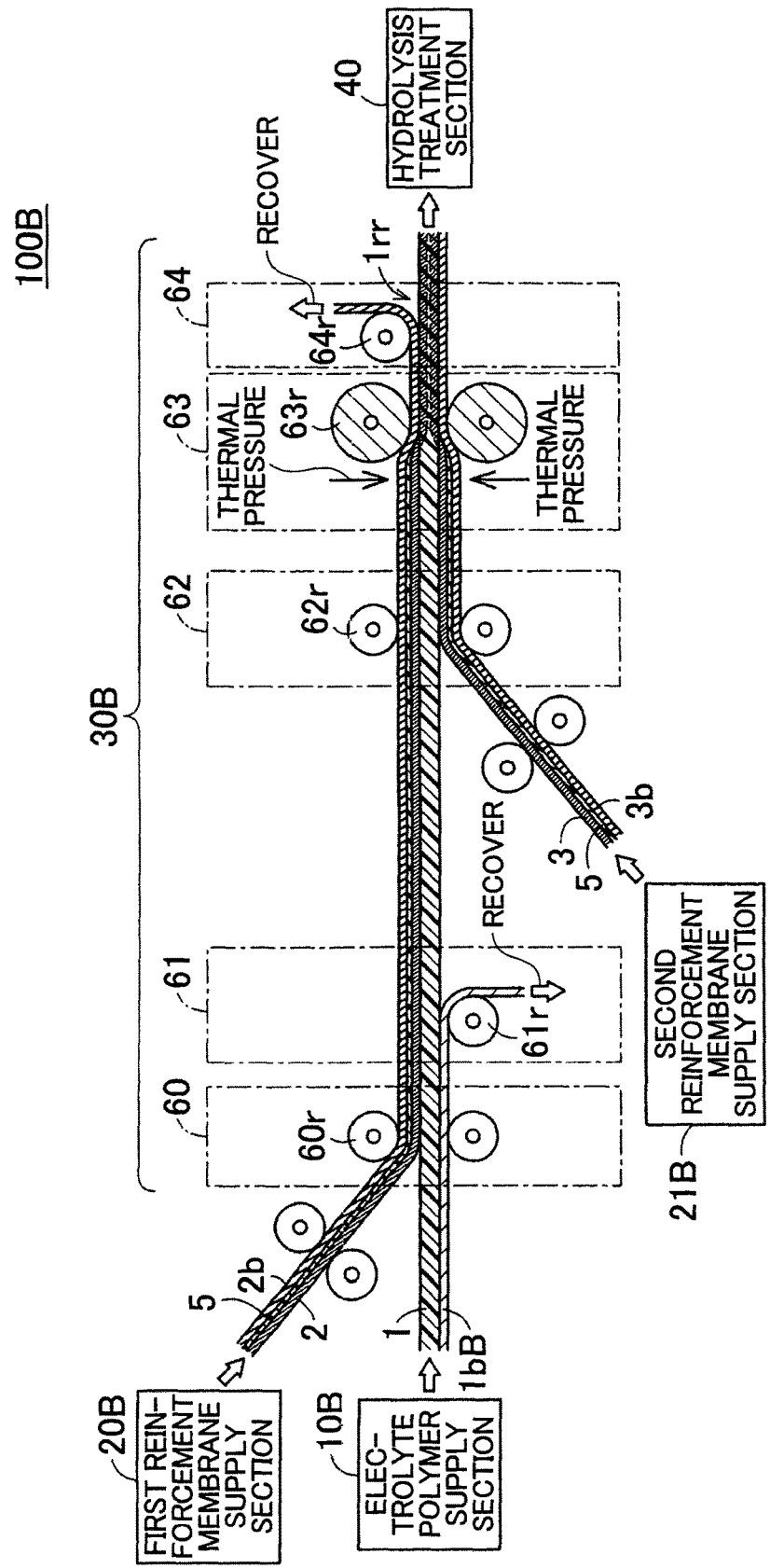
FIG. 18 is a schematic view that shows a structure of a manufacturing apparatus of manufacturing a reinforced electrolyte membrane as a third embodiment.

FIG. 18 is a schematic diagram that shows a structure of a manufacturing apparatus 100B of manufacturing a reinforced electrolyte membrane as a third embodiment of the present invention. In the manufacturing apparatus 100B of the third embodiment, the first and second reinforcement membranes 2 and 3 are integrated with the belt-like electrolyte polymer 1 in the same thermocompression bonding step. The manufacturing apparatus 100B of the third embodiment includes an electrolyte polymer supply section 10B, first and second reinforcement membrane supply sections 20B and 21B, a processing section 30B and the hydrolysis treatment section 40.

The electrolyte polymer supply section 10B has the same structure as the electrolyte polymer supply section 10 described in the second embodiment except that a material of a back sheet when the belt-like electrolyte polymer 1 is conveyed to the processing section 30B is different. The belt-like electrolyte polymer 1 that is supplied by the electrolyte polymer supply section 10B is the same as that described in the second embodiment. In the present third embodiment, the back sheet 1bB to which the belt-like electrolyte polymer 1 is disposed is desirable to be formed with a material of which adhesiveness with the belt-like electrolyte polymer 1 can be adjusted to be lower than that with the back sheet 1b described in the second embodiment. Further, the back sheet 1bB of the third embodiment may be lower in the heat resistance than that of the back sheet 1b described in the second embodiment.

The back sheet 1bB of the third embodiment is formed from, for example, polypropylene (PP) described below.

<PP that Forms Back Sheet 1bB>
Elastic modulus: about 0.6 to 0.8 GPa
Thickness: about 40 to 60 μm
Surface roughness (Ra): about 400 to 600 nm
Maximum continuous operating temperature: about 120 to 140° C.

In the third embodiment, the adhesiveness between the belt-like electrolyte polymer 1 and the back sheet 1bB is adjusted in advance to be lower than the adhesiveness between the belt-like electrolyte polymer 1 and the first reinforcement membrane 2, which were stuck with each other in the first sticking section 60. Specifically, the adhesiveness between the belt-like electrolyte polymer 1 and the back sheet 1bB may be an extent in which a measurement result of 0.02 to 0.10 N/cm can be obtained in the 90° tensile test. It is experimentally confirmed that when the back sheet 1bB is formed from PP described below and the belt-like electrolyte polymer 1 and the back sheet 1bB are stuck under the following pressing condition, the adhesiveness in the range described above can be obtained.

<Example of PP that Forms Back Sheet 1bB>
Elastic modulus: 0.7 GPa
Thickness: 50
Surface roughness (Ra): 500 nm
Maximum continuous operating temperature: 130° C.
<Pressing Condition Between Belt-Like Electrolyte Polymer 1 and Back Sheet 1bB>
Temperature: 25° C.
Pressing force: 0.4 MPa Each of the first and second reinforcement membrane supply sections 20B and 21B has the same structure as the first and second reinforcement membrane supply sections 20A and 21A, which were described in the second embodiment, except that a structure of a belt-like member conveyed to the processing section 30B is different. Each of the first and second reinforcement membrane supply sections 20B and 21B supplies the first and second reinforcement membranes 2 and 3, which are disposed to the heat-resistant back sheets 2b and 3b with an intermediate layer 5 sandwiched therebetween to the processing section 30B.

The first and second reinforcement membranes 2 and 3 are the same as those described in the second embodiment and formed from a porous membrane member such as ePTFE. The heat-resistant back sheets 2b and 3b to which each of the first and second reinforcement membranes 2 and 3 is disposed are the same as those described in the second embodiment and formed from a resin film having high heat resistance such as PFA.

The intermediate layer 5 functions as an adhesive layer that imparts the adhesiveness between the first and second reinforcement membranes 2 and 3 and the heat-resistant back sheets 2b and 3b. The intermediate layer 5 is formed from an electrolyte polymer the same kind or similar as the electrolyte polymer that forms the belt-like electrolyte polymer 1. The electrolyte polymer that forms the intermediate layer 5 intrudes into fine pores of the respective reinforcement membranes 2 and 3 in an interface between the respective reinforcement membranes 2 and 3 and the respective heat-resistant back sheets 2b and 3b. The intermediate layer 5 is formed by coating a solution of the electrolyte polymer on an adherend surface of the first and second reinforcement membranes 2 and 3 or the heat-resistant back sheets 2b and 3b by means of a coating tool such as a die coater. Each of the first and second reinforcement membrane supply sections 20B and 21B may have a sticking section that sticks the first and second reinforcement membranes 2 and 3 and the heat-resistant back sheets 2b and 3b after disposing the intermediate layer 5.

Herein, the adhesiveness between the first reinforcement membrane 2 and the heat-resistant back sheet 2b, which is imparted by the intermediate layer 5 is adjusted to be higher than the adhesiveness between the belt-like electrolyte polymer 1 which is supplied from the polymer supply section 10B and the back sheet 1bB thereof. Specifically, the adhesiveness between the first and second reinforcement membranes 2 and 3 and the heat-resistant back sheets 2b and 3b may be set to an extent that can obtain a measurement value of 0.1 to 0.5 N/cm in the 90° peel test. Thus, the back sheet 2b can be easily peeled off from the belt-like electrolyte polymer 1, which is executed in the processing section 30B described below.

The processing section 30B disposes and thermally compresses the first and second reinforcement membranes 2 and 3 on both sides of the belt-like electrolyte polymer 1 that is being conveyed to integrate these and form a both-surface reinforced membrane 1rr. The processing section 30B includes a first sticking section 60, a first peel section 61, a second sticking section 62, a thermocompression bonding section 63 and a second peel section 64, which are disposed in this order in a conveying direction of the belt-like electrolyte polymer 1.

Figure 19:
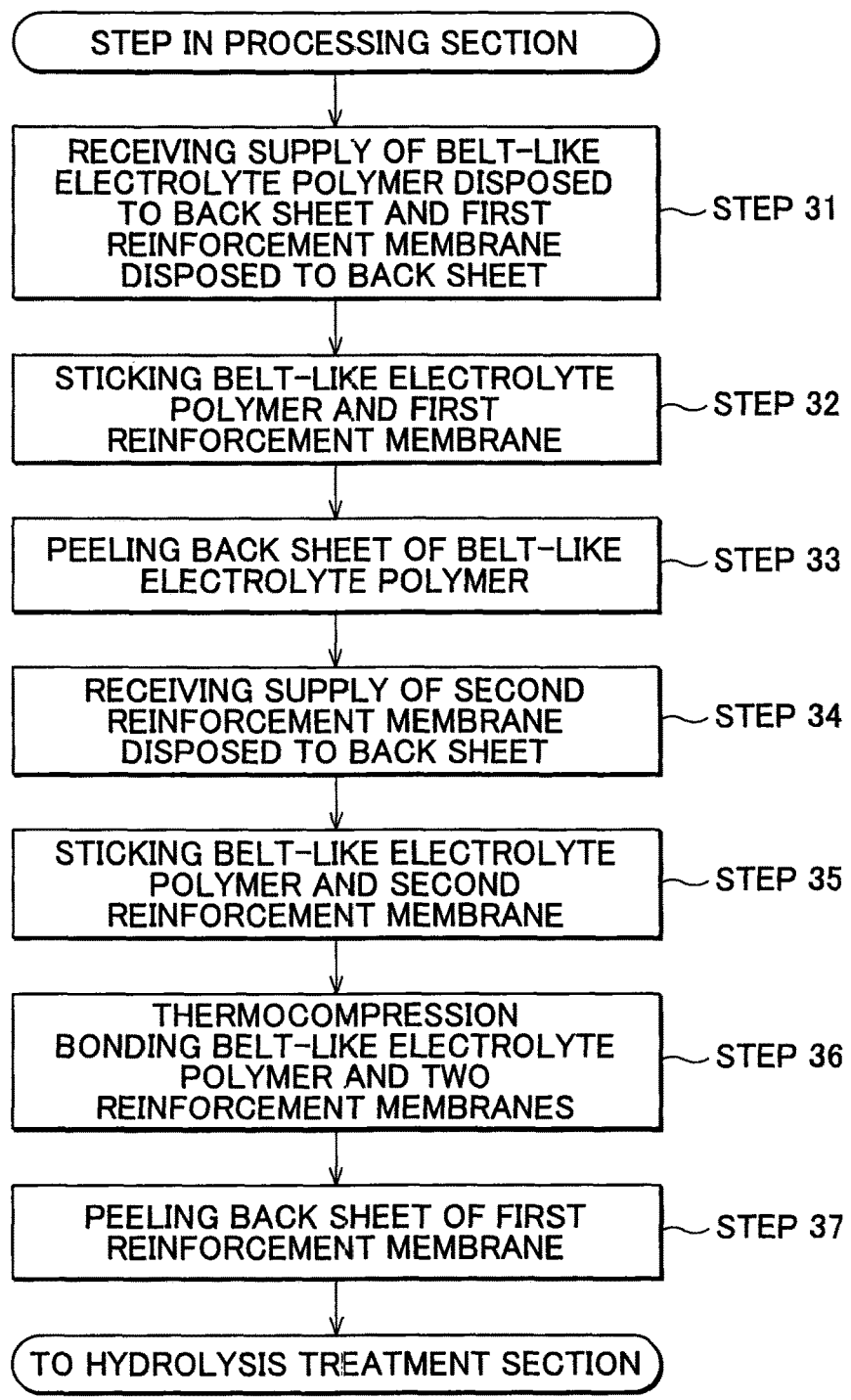
FIG. 19 is a process chart that shows a procedure of steps executed in a processing section of a third embodiment.
Figure 21:
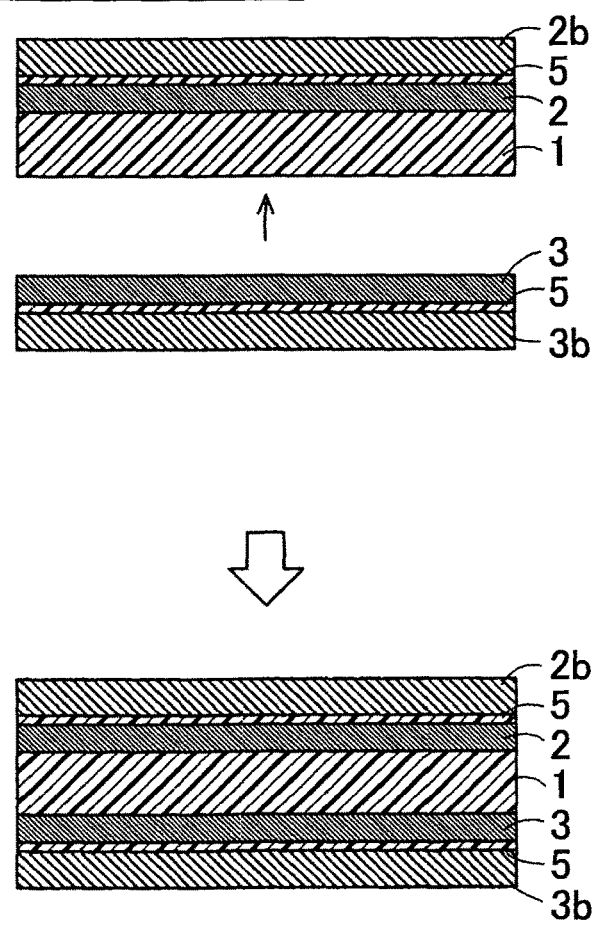
FIG. 21 is a schematic view that shows a content of a step in the second sticking section.

FIG. 19 is a process chart that shows a procedure of steps executed by the processing section 30B of the third embodiment. Each of FIG. 20 to FIG. 22 is a schematic diagram that describes contents of the respective steps executed in the processing section 30A shown in FIG. 19. In each of FIG. 20 to FIG. 22, a state of a belt-like member that is processed in the processing section 30B of the third embodiment is schematically shown for each of steps by a schematic cross sectional view when each of the belt-like members is cut in a width direction. Hereinafter, contents of steps in each of the constituent sections 60 to 64 of the processing section 30B of the third embodiment will be sequentially described with FIG. 18 and FIG. 19 to FIG. 22 as reference drawings.

The processing section 30B receives a supply of the belt-like electrolyte polymer 1 disposed to the back sheet 1bB from the electrolyte polymer supply section 10B (step 31 of FIG. 19). Further, the processing section 30B receives a supply of the first reinforcement membrane 2 disposed on the heat-resistant back sheet 2b via the intermediate layer 5 from the first reinforcement membrane supply section 20B. The belt-like electrolyte polymer 1 and the first reinforcement membrane 2 are conveyed to the first sticking section 60.

FIG. 20 is a schematic diagram that shows contents of steps in the first sticking section 60 and the first peel section 61. The first sticking section 60 brings the belt-like electrolyte polymer 1 and the first reinforcement membrane 2 into surface contact with each other and into close contact by the pressing roller 60r (step 32). The belt-like electrolyte polymer 1 and the first reinforcement membrane 2, which are stuck with each other is conveyed to the first peel section 61 in a state sandwiched between the back sheet 1bB and the heat-resistant back sheet 2b.

The first peel section 61 peels and recovers the back sheet 1bB from the belt-like electrolyte polymer 1 by the peel roller 61r (step 33). As described above, the adhesiveness between the belt-like electrolyte polymer 1 and the back sheet 1bB is adjusted in advance to be lower than the adhesiveness between the belt-like electrolyte polymer 1 and the first reinforcement membrane 2 and the adhesiveness between the first reinforcement membrane 2 and the heat-resistant back sheet 2b. Therefore, in the first peel section 61, the back sheet 1*b*B can be easily peeled. The belt-like electrolyte polymer 1 from which the back sheet 1*b*B was peeled is conveyed to the second sticking section 62 in a state supported by the first reinforcement membrane 2 and the heat-resistant back sheet 2*b*.

FIG. 21 is a schematic diagram that shows a content of a step in the second sticking section 62. The second sticking section 62 receives a supply of the second reinforcement membrane 3 disposed on the heat-resistant back sheet 3*b* via the intermediate layer 5 from the second reinforcement membrane supply section 21B (step 34). In the second sticking section 62, the pressing roller 62*r* brings an exposed surface of the belt-like electrolyte polymer 1 (a surface on a side opposite to the first reinforcement membrane 2) and the second reinforcement membrane 3 into close contact (step 35). The pressing condition in the second sticking section 62 may be the same as the pressing condition in the first sticking section 60. A laminate member of the first and second reinforcement membranes 2 and 3 and the belt-like electrolyte polymer 1 is conveyed to the thermocompression bonding section 63 in a state sandwiched between the heat-resistant back sheets 2*b* and 3*b*.

FIG. 22 is a schematic diagram that shows contents of steps in the thermocompression bonding section 63 and the second peel section 64. In the thermocompression bonding section 63, the hot-roller 63*r* thermally compresses the belt-like electrolyte polymer 1 and the first and second reinforcement membranes 2 and 3, and a both-surface reinforced membrane 1*rr* is produced (step 36). In the thermocompression bonding step, an electrolyte polymer of the melted belt-like electrolyte polymer 1 is impregnated in the first and second reinforcement membranes 2 and 3, and an electrolyte polymer of the melted intermediate layer 5 is impregnated in the first and second reinforcement membranes 2 and 3. Therefore, according to the manufacturing apparatus 100B of the third embodiment, since a thin film layer formed of an electrolyte polymer of the intermediate layer 5 is formed on both surfaces of the both-surface reinforced membrane 1*rr*, excellent surface property can be secured in the both-surface reinforced membrane 1*rr*.

The both-surface reinforced membrane 1*rr* is conveyed to the second peel section 64 in a state sandwiched by two heat-resistant back sheets 2*b* and 3*b*. In the second peel section 64, the peel roller 64*r* peels the heat-resistant back sheet 2*b* on the side of the first reinforcement membrane 2 from the both-surface reinforced membrane 1*rr* (step 37). The both-surface reinforced membrane 1*rr* disposed to the heat-resistant back sheet 3*b* is conveyed to the hydrolysis treatment section 40. In the hydrolysis treatment section 40, the proton conductivity is imparted to the both-surface reinforced membrane 1*rr*, and a reinforced electrolyte membrane is completed. The step executed in the hydrolysis treatment section 40 is the same as that described in the first embodiment (FIG. 6).

As described above, according to the manufacturing apparatus 100B of the third embodiment, the first and second reinforcement membranes 2 and 3 can be conveyed after securing the adhesiveness with the heat-resistant back sheets 2*b* and 3*b*. Further, since the intermediate layer 5 containing the electrolyte polymer is disposed between the first and second reinforcement membranes 2 and 3 and the heat-resistant back sheets 2*b* and 3*b*, the both-surface reinforced membrane 1*rr* having excellent surface property can be obtained. Further, according to the manufacturing apparatus 100B of the third embodiment, since the first and second reinforcement membranes 2 and 3 can be thermally compressed on the belt-like electrolyte polymer 1 in the same step, the number of steps can be reduced compared with a structure where the first and second reinforcement membranes 2 and 3 are separately thermally compressed.

D. Modification

D1. Modification 1:

In the respective embodiments described above, the first and second reinforcement membranes 2 and 3 were formed of the ePTFE. However, the first and second reinforcement membranes 2 and 3 may be formed of a material other than the ePTFE. Further, in the respective embodiments described above, the back sheet of the first and second reinforcement membranes 2 and 3 was formed of PFA or PET. However, the back sheet of the first and second reinforcement membranes 2 and 3 may be formed of a material other than PFA and PET.

D2: Modification 2:

In each of the embodiments, any of the back sheets 1*b*, 2*b*, 3*b*, 2*bf*, 3*bf*, 2*b*B and 3*b*B was formed of a monolayer film member. However, each of the back sheets 1*b*, 2*b*, 3*b*, 2*bf*, 3*bf*, 2*b*B and 3*b*B may have a multi-layered structure in which a plurality of different material layers is stacked. In this case, a back sheet that undergoes the thermocompression bonding step is preferable to have both outermost layers that have high heat resistance (maximum continuously operating temperature: about 200 to 270° C., for example) and smooth surface property (surface roughness (Ra): about 10 to 800 nm, for example). Thus, the thermocompression bonding step between the belt-like electrolyte polymer 1 and the first and second reinforcement membranes 2 and 3 can be responded and an excellent surface property of the single-surface reinforced membrane 1*r* and both-surface reinforced membrane 1*rr* after the thermocompression bonding step can be secured.

D3. Modification 3:

Each of the apparatuses 100, 100A and 100B of manufacturing of the embodiments manufactured a reinforced electrolyte membrane in which both surface sides are reinforced by introducing the first and second reinforcement membranes 2 and 3 in both surfaces of the belt-like electrolyte polymer 1. However, each of the apparatuses 100, 100A and 100B of manufacturing of each embodiment described above may manufacture a reinforced electrolyte membrane in which only one surface side obtained by introducing the first reinforcement membrane 2 in one surface of the belt-like electrolyte polymer 1 is reinforced.

D4. Modification 4:

The manufacturing apparatus 100B of the third embodiment thermally compressed the first and second reinforcement membranes 2 and 3 to the belt-like electrolyte polymer 1 simultaneously in the same step. However, the manufacturing apparatus 100B of the third embodiment may separately execute the thermocompression bonding step of the first and second reinforcement membranes 2 and 3 to the belt-like electrolyte polymer 1.

D5. Modification 5:

According to the third embodiment, the intermediate layer 5 was formed to cover an entirety of interfaces between the respective reinforcement membranes 2 and 3 and the heat-resistant back sheets 2*b* and 3*b*. However, the intermediate layer 5 may not be formed to cover an entirety of interfaces between the respective reinforcement membranes 2 and 3 and the back sheets 2*b* and 3*b*. The intermediate layer 5 may be formed to be scattered in a plurality of positions between the respective reinforcement membranes 2 and 3 and the respective heat-resistant back sheets.

The present invention is not limited to embodiments, examples and modifications, which were described above, and, in the range that does not deviate from the gist of the invention, can be realized in various configurations. For example, technical features in embodiments, examples and modifications can be optionally replaced or combined to solve a part or an entirety of the problems described above, or to achieve a part or an entirety of effects described above. Further, the technical features, unless described as indispensable in the specification, can be optionally eliminated.

The invention claimed is:

1. A manufacturing method of manufacturing a reinforced electrolyte membrane that is used in a fuel cell and has a reinforcement member disposed inside thereof, comprising:
   a step (a) of conveying a belt-shaped electrolyte polymer that is a belt-shaped body of a first electrolyte polymer in a state disposed on a surface of a first back sheet in a longitudinal direction of the belt-shaped electrolyte polymer as a conveying direction;
   a step (b) of conveying a first belt-shaped reinforcement member that is a belt-shaped body in a state disposed on a surface of a second back sheet in the conveying direction and disposing the first belt-shaped reinforcement member on a surface of the belt-shaped electrolyte polymer;
   after the step (b), a step (c) of peeling the first back sheet from the belt-shaped electrolyte polymer in a state where a first adhesiveness between the second back sheet and the first belt-shaped reinforcement member is higher than a second adhesiveness between the first back sheet and the belt-shaped electrolyte polymer; and
   (d) a step of providing a second electrolyte polymer between the second back sheet and the first belt-shaped reinforcement member, wherein
   the first adhesiveness between the second back sheet and the first belt-shaped reinforcement member is set higher in advance than the second adhesiveness between the first back sheet and the belt-shaped electrolyte polymer before the step (b) by disposing in advance an intermediate layer that contains the second electrolyte polymer between the first belt-shaped reinforcement member and the second back sheet, and
   the step (b) includes a step of pressing the belt-shaped electrolyte polymer and the first belt-shaped reinforcement member such that a third adhesiveness between the belt-shaped electrolyte polymer and the first belt-shaped reinforcement member is to be higher than the second adhesiveness between the first back sheet and the belt-shaped electrolyte polymer.

2. The manufacturing method according to claim 1, further comprising:
   a step (e) of disposing a second belt-shaped reinforcement member on the surface of the belt-shaped electrolyte polymer from which the first back sheet was peeled and thermally compressing the belt-shaped electrolyte polymer from which the first back sheet was peeled and the first and second belt-shaped reinforcement members.

* * * * *